US011844135B2

(12) United States Patent
Sha et al.

(10) Patent No.: US 11,844,135 B2
(45) Date of Patent: Dec. 12, 2023

(54) STATE TRANSITIONS FOR IDLE MODE TRANSMISSIONS USING PRE-CONFIGURED DEDICATED RESOURCES

(71) Applicant: ZTE Corporation, Guangdong (CN)

(72) Inventors: Xiubin Sha, Guangdong (CN); Bo Dai, Guangdong (CN); Ting Lu, Guangdong (CN); Kun Liu, Guangdong (CN); Xu Liu, Guangdong (CN)

(73) Assignee: ZTE Corporation, Guangdong (CN)

( * ) Notice: Subject to any disclaimer, the term of this patent is extended or adjusted under 35 U.S.C. 154(b) by 437 days.

(21) Appl. No.: 17/167,287

(22) Filed: Feb. 4, 2021

(65) Prior Publication Data

US 2021/0168894 A1 Jun. 3, 2021

Related U.S. Application Data

(63) Continuation of application No. PCT/CN2018/099708, filed on Aug. 9, 2018.

(51) Int. Cl.
*H04W 76/27* (2018.01)
*H04W 76/28* (2018.01)
(Continued)

(52) U.S. Cl.
CPC ....... *H04W 76/27* (2018.02); *H04W 52/0235* (2013.01); *H04W 72/21* (2023.01);
(Continued)

(58) Field of Classification Search
CPC ..... H04L 27/2601; H04L 1/00; H04L 5/0053; H04L 5/0094; H04L 5/00; H04W 28/0268;
(Continued)

(56) References Cited

U.S. PATENT DOCUMENTS 9,648,657 B2 * 5/2017 Pelletier ................ H04W 76/27
2014/0242962 A1 * 8/2014 Choi ..................... H04W 76/12
455/418
(Continued)

FOREIGN PATENT DOCUMENTS

CN 103460788 A 12/2013
CN 106717105 A 5/2017
(Continued)

OTHER PUBLICATIONS

International Search Report and Written Opinion in International Application No. PCT/CN2018/099708, dated May 9, 2019, 7 pages.
(Continued)

*Primary Examiner* — Nathan S Taylor
(74) *Attorney, Agent, or Firm* — Perkins Coie LLP

(57) ABSTRACT

Methods, systems, and devices for operation in a data transmission state in an idle mode using pre-configured dedicated resources are described. An exemplary method for wireless communication includes transmitting a first message comprising an indication of pre-configured dedicated resources for a communication between the network device and a terminal, and receiving a second message over the pre-configured dedicated resources, where a transmission of the second message by the terminal causes the terminal to switch from an idle state to a data transmission state in an idle mode. Another exemplary methods for wireless communication includes receiving a first message comprising an indication of pre-configured dedicated resources for a communication between a network device and the terminal, and switching from an idle state to a data transmission state in an idle mode upon transmitting a second message over the pre-configured dedicated resources.

18 Claims, 20 Drawing Sheets

(51) Int. Cl.
*H04W 52/02* (2009.01)
*H04W 74/08* (2009.01)
*H04W 72/21* (2023.01)
*H04W 72/23* (2023.01)

(52) U.S. Cl.
CPC ....... *H04W 72/23* (2023.01); *H04W 74/0833* (2013.01); *H04W 76/28* (2018.02)

(58) Field of Classification Search
CPC ..... H04W 28/10; H04W 76/10; H04W 80/02; H04W 76/12; H04W 28/02; H04W 80/10; H04W 76/20; H04W 52/0235; H04W 74/0833; H04W 76/27; H04W 76/28; H04W 72/21; H04W 72/23; H04W 4/70; H04W 52/02; H04W 72/04; H04W 74/04; H04W 74/08; H04W 76/00; H04W 72/12; Y02D 30/70
See application file for complete search history.

(56) References Cited

U.S. PATENT DOCUMENTS

| | | | | |
|---|---|---|---|---|
| 2017/0303240 | A1* | 10/2017 | Basu Mallick | H04W 72/04 |
| 2017/0303247 | A1* | 10/2017 | Yasukawa | H04L 5/0053 |
| 2018/0279267 | A1* | 9/2018 | Yasukawa | H04W 48/10 |
| 2019/0074936 | A1* | 3/2019 | Lee | H04L 5/0055 |
| 2019/0230499 | A1* | 7/2019 | Sun | H04W 24/08 |
| 2020/0037345 | A1* | 1/2020 | Ryoo | H04W 76/27 |

FOREIGN PATENT DOCUMENTS

| | | | | |
|---|---|---|---|---|
| CN | 108243630 A | | 7/2018 | |
| EP | 2847917 B1 | * | 10/2018 | .......... H04L 5/0007 |
| EP | 2847917 B1 | | 10/2018 | |
| WO | 2018031603 A1 | | 2/2018 | |
| WO | WO-2018031603 A1 | * | 2/2018 | ............ H04W 36/08 |

OTHER PUBLICATIONS

Qualcomm Incorporated, "Email discussion report: [99#45][NB-IoT/MTC] Early data transmission", 3GPP TSG-RAN WG2 Meeting #99bis R2-1710888,Oct. 13, 2017 (Oct. 13, 2017), Prague, Czechia, 42 pages.

Huawei, "Report of email discussion [99bis#55][MTC/NB-IoT] EDT RRC messages", 3GPP TSG-RAN WG2 Meeting#100 R2-1713182,Dec. 1, 2017 (Dec. 1, 2017), Reno, USA, 29 pages.

Co-Pending Chinese Application No. 2022108791316, Notification to Complete Formalities of Registration, dated Apr. 27, 2023, 4 pages with unofficial translation.

Chinese Office Action for Application No. 2022108791316, dated Feb. 16, 2023, 19 pages with unofficial translation.

* cited by examiner

STATE TRANSITIONS FOR IDLE MODE TRANSMISSIONS USING PRE-CONFIGURED DEDICATED RESOURCES

CROSS-REFERENCE TO RELATED APPLICATIONS

This application is a continuation of International Patent Application No. PCT/CN2018/099708, filed on Aug. 9, 2018, the contents of which are incorporated herein by reference in its entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, thereby requiring methods to conserve energy, especially during the constant communication of small data packets.

SUMMARY

This document relates to methods, systems, and devices that include state transitions for providing pre-configured dedicated resources for communications during the RRC (radio resource control) idle state, thereby enabling significant energy savings during the communication of small data packets. For example, the states defined by embodiments of the disclosed technology include an RRC idle state, a data transmission state in idle mode, and an RRC connection state, with the UE behaviors defined differently for each of these states.

In one exemplary aspect, a wireless communication method is disclosed. The method includes transmitting a first message comprising an indication of pre-configured dedicated resources for a communication between the network device and a terminal, and receiving a second message over the pre-configured dedicated resources, where a transmission of the second message by the terminal causes the terminal to switch from an idle state to a data transmission state in an idle mode, wherein the terminal is without an established RRC connection in the idle state, and wherein in the data transmission state in the idle mode, the terminal is configured to perform the communication with the network device over the pre-configured dedicated resources, monitor a user-specific search space, and perform terminal identification using the pre-configured dedicated resources.

In another exemplary aspect, a wireless communication method is disclosed. The method includes receiving a first message comprising an indication of pre-configured dedicated resources for a communication between a network device and the terminal, and switching from an idle state to a data transmission state in an idle mode upon transmitting a second message over the pre-configured dedicated resources, wherein the terminal is without an established RRC connection in the idle state, and wherein in the data transmission state in the idle mode, the terminal is configured to perform the communication with the network device over the pre-configured dedicated resources, and monitor a user-specific search space.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
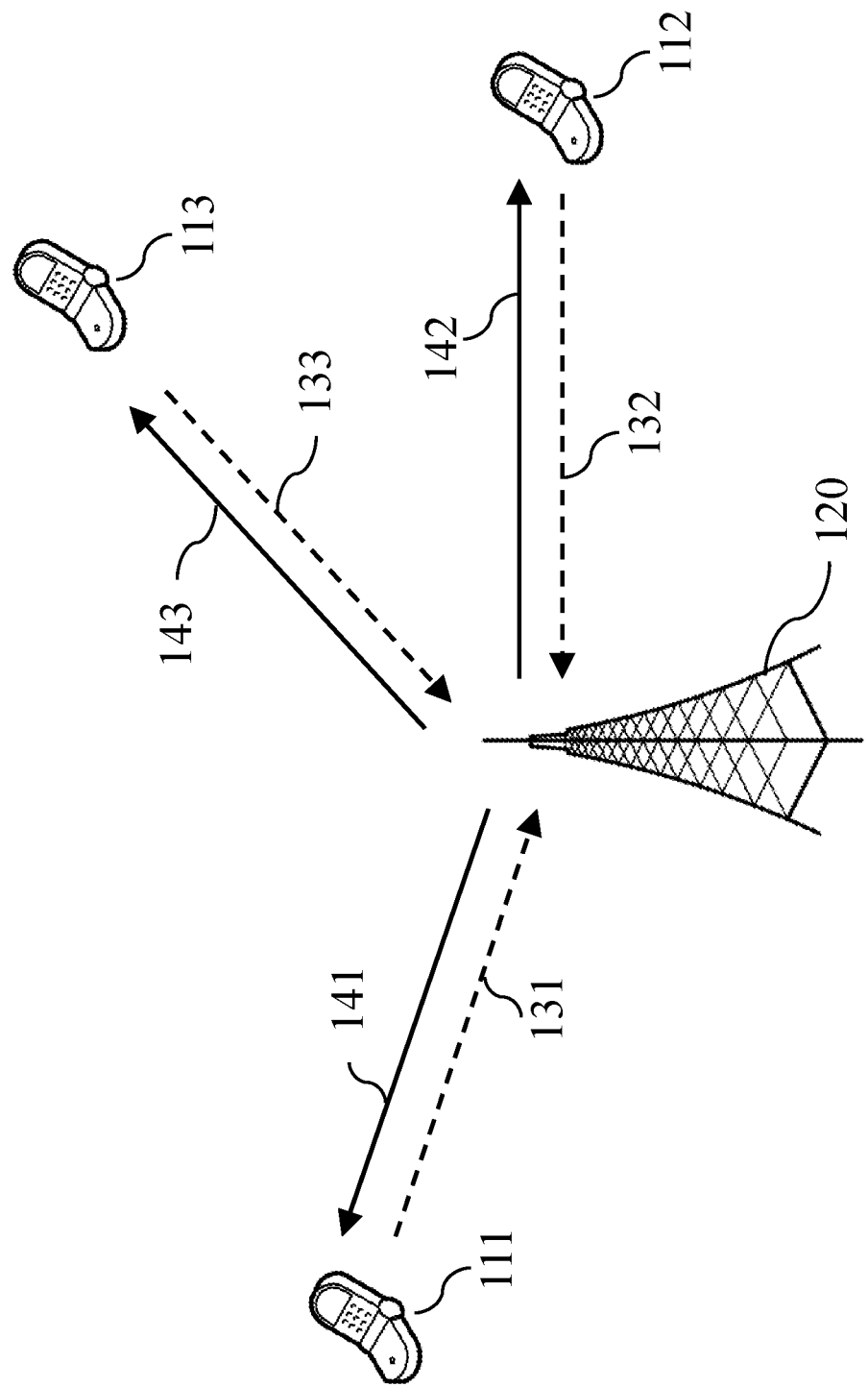
FIG. 1 shows an example of a base station (BS) and user equipment (UE) in wireless communication, in accordance with some embodiments of the presently disclosed technology.

In M2M (Machine-to-Machine) communication systems, UE (user equipment) energy saving is crucial. The power consumption of the UE is mainly reflected in the establishment of the RRC connection process, and the data transmission, reception and channel monitoring of the RRC connection state. For (Narrowband) NB-IoT (Internet-of-Things) technology, which mainly carries small data transmission, the UE keeps the RRC connection state for a short time, so the UE power consumption is mainly consumed in the RRC connection establishment phase (e.g. in the PRACH (physical random access channel) process). With the introduction of EDT (Early Data Transmission), wherein small data packets can be transmitted in the PRACH process, UEs transmitting small data packets do not need to enter the RRC connection state. Thus, the power consumption of the UE transmitting small data is mainly consumed in the PRACH process.

The PRACH process in the RRC connection establishment process is generally based on competing PRACH resources, and the process is divided into four steps:

Step 1: Preamble (Msg1: UE→eNodeB)
Step 2: RAR (Re-Authorization-Request) (Msg2: eNodeB→UE)
Step 3: 1st RRC Message (Msg3: UE→eNodeB)
Step 4: 2nd RRC Message (Msg4: eNodeB→UE)

The Msg3 carries the UE identifier, and the Msg4 completes the contention resolution based on the UE identifier (identifies the UE), and the PRACH process ends. In the non-EDT scheme, after the contention resolution is completed, the UE enters the RRC connection state and starts UE-Specific data transmission. For the EDT solution, Msg3 can carry uplink data, Msg4 can carry downlink data, and the contention resolution completes that the data has been successfully sent to the destination, and the UE returns to the RRC idle state. It can be seen from this process that Msg1 and Msg2 are essential for both EDT and non-EDT solutions.

If the idle mode UE is pre-configured with dedicated resources, the data transmission and reception can be performed on the pre-configured dedicated resources, and the contention resolution (UE identification) can be completed based on the pre-configured resources in Msg2, thereby shortening the PRACH process and improving small data transmission efficiency.

When the UE performs data transmission and reception on the pre-configured dedicated resource in the idle mode (also referred to as "a data transmission state in idle mode"), its behavior is different from the RRC idle state and the RRC connection state.

For a UE in the RRC idle state, at least the following behavior is performed:
(a) Network-side:
 (i) Configuring paging DRX parameters for UE;
 (ii) Configuring mobility related parameters for the UE;
 (iii) for a user plane (UP) data transfer scheme, the UE context is suspended, and the connections over UU interface and S1 interface are released; and
 (iv) for a control plane (CP) data transmission scheme, the UE context is released, and the connections over UU interface and S1 interface are released.
(b) Terminal-side:
 (i) performing paging-related monitoring based on network configuration of the DRX parameters, and the NAS layer negotiated eDRX parameters and PSM parameters in accordance with standard pre-defined rules;
 (ii) perform neighborhood wireless quality measurement, and cell selection and reselection;
 (iii) receive system messages;
 (iv) PRACH process based on contention-based PRACH resources;
 (v) for a user plane (UP) data transmission scheme, the UE context is suspended, and the connections over UU interface and S1 interface are released;
 (vi) for a control plane (CP) data transmission scheme, the UE context is released, and the connections over UU interface and S1 interface are released; and
 (vii) css_paging monitoring.

For a UE in the RRC connection state, at least the following behavior is performed:
(a) Network-side
 (i) perform point-to-point communication with the UE.
(b) Terminal-side
 (i) perform point-to-point communication with the eNB; and
 (ii) monitor RRC Connection state user dedicated search space USS.

FIG. 1 shows an example of a wireless communication system (e.g., an LTE, 5G or NR cellular network) that includes a BS 120 and one or more user equipment (UE) 111, 112 and 113. In some embodiments, the BS transmits an indication of the pre-configured dedicated resources (141, 142, 143) to the UEs. Subsequently, the UEs can use those dedicated resources for point-to-point communication (131, 132, 133) with the BS when they are in the idle mode. The UE may be, for example, a smartphone, a tablet, a mobile computer, a machine to machine (M2M) device, a terminal, a mobile device, an Internet of Things (IoT) device, and so on.

Embodiments of the disclosed technology provide, in an example, the state transition of the UE in the RRC idle mode based on the pre-configured resource-based data transmission state, the RRC idle state, and the RRC connected state. Section headings are used in the present document to improve readability of the description and do not in any way limit the discussion or the embodiments (and/or implementations) to the respective sections only.

EXAMPLE EMBODIMENTS FOR BASE STATION OPERATION

Example 1. The base station monitors the information sent by the UE in the idle mode pre-configured dedicated resource time-frequency location of the UE and/or sends downlink information to the UE, and the UE is in the RRC idle mode based on the data transmission state of the pre-configured resource.

For a UE that is in a data transmission state in an idle mode, and which uses pre-configured dedicated resources, at least the following behavior is performed:
Network-side:
 (a) Information interaction with UE based on the pre-configured dedicated resources for idle mode data transmission.
UE-side:
 (a) Information interaction with eNB based on the pre-configured dedicated resources for idle mode data transmission.
 (b) Monitoring Idle mode user dedicated search space (USS_IDLE)
 (c) Perform UE identification based on pre-configured dedicated resources Example 2. In conjunction with Example 1, the UE's idle mode preconfigured dedicated resource is a dedicated resource configured for fast data transmission by the base station. The dedicated resource includes at least one of the following resources:

(a) UE-specific search space in the idle mode data transmission phase (USS_IDLE)
(b) PUSCH resources
(c) Contention-free Preamble resources (CFRA resources)

Example 3. In conjunction with Example 2, the method is characterized in that if the preconfigured dedicated resource is a USS_IDLE resource, the base station can send PDCCH DCI information to the UE at the USS_IDLE resource location, and the PDCCH DCI can be used for at least one of the following purposes:

(a) Confirming the uplink information sent by the UE in the idle mode pre-configured dedicated resource
(b) Instructing the UE to enter the RRC idle state
(c) Instructing the UE to enter the RRC connection state
(d) PUSCH resource scheduling for the UE (UL Grant)
(e) PDSCH resource scheduling (DL Grant) for the UE
(f) Instruct UE to initiate PRACH process (PDCCH order)

Example 4. In conjunction with Example 3, wherein the PDCCH DCI of the USS_IDLE is scrambled by the UE-specific RNTI or the RA-RNTI corresponding to the CFRA resource, and the UE enters an RRC connection state or a state indicated by the eNB.

Example 5. In conjunction with Example 2, it is characterized in that if the pre-configured dedicated resource is a PUSCH resource, the base station monitors the PUSCH channel at the preconfigured PUSCH resource location. The PUSCH carries signaling radio bearers (SRBs) and/or data radio bearers (DRBs).

Example 6. In conjunction with Example 5, wherein if the base station detects the PUSCH channel information in the pre-configured PUSCH resource location, and the PUSCH carries the BSR information, the base station grants the uplink data transmission resource to the UE based on the BSR information (UL Grant). The uplink UL Grant is sent to the UE by the PDCCH DCI scrambled by the UE Specific RNTI; the UE enters an RRC connection state or a state indicated by the eNB.

Example 7. In conjunction with Example 5, it is characterized in that if the base station detects PUSCH channel information in the preconfigured PUSCH resource location and PUSCH carries the NAS PDU information or the user-level data PDU, the base station will confirm or deny the PDU carried by PUSCH. The confirmation may be sent to the UE through the PDCCH DCI scrambled with the UE-specific RNTI, or sent to the UE through PDSCH or MAC CE over the DL resource granted by PDCCH scrambled with UE-specific RNTI. The UE enters the RRC connection state or an eNB indicated state.

Example 8. In conjunction with Examples 6-7, wherein the base station may indicate the UE to enter a new state through the PDCCH DCI scrambled with the UE specific RNTI, or sent to the UE through PDSCH or MAC CE over the DL resource granted by PDCCH scrambled with UE specific RNTI. The new state includes at least one of: an RRC connected state, an RRC idle state, and an data transmission DRX state in RRC idle mode based on pre-configured resource. The indication may be an explicit indication or an implicit indication by a certain information bit (e.g., predefined default state is used if there is not explicit indication).

Example 8-1. In conjunction with Example 8, it is characterized in that if the base station can direct the UE into the RRC connection state with an explicit indication, but if the base station does not send the explicit indication, the base station considers that the UE will enter the RRC idle state by default after the USS_IDLE search space monitoring finished.

Example 8-2. In conjunction with Example 8, wherein if the base station can explicitly indicate that the UE enters the RRC idle state, but the base station does not send the explicit indication, the base station considers that the UE is in the USS_IDLE search space. After the USS_IDLE search space monitoring is completed, the UE enters RRC connection state by default.

Example 8-3. In conjunction with Example 8, the method is characterized in that if the base station can explicitly instruct the UE to enter the data transfer DRX state in RRC idle mode based on the preconfigured dedicated resource, but the base station does not send the explicit indication, the base station considers the UE to be in the recent state before entering the USS_IDLE monitoring state by default after the USS_IDLE search space monitoring finished.

Example 8-4. In conjunction with Example 8, wherein if the base station can explicitly indicate the target state of the UE, but the base station does not send the explicit indication, the base station considers that the UE keeps the current status by default (monitor current PDCCH search space).

Example 9. In conjunction with Example 5, it is characterized in that if the base station detects PUSCH channel information in the preconfigured PUSCH resource location, and PUSCH carries an RRC message containing a dedicated NAS PDU information (the message contains at least one of the following: RRCConnectionRequest, RRCEarlyDataRequest) or contains user level data PDU and RRC messages (the message contains at least one of the following: RRCConnectionRequest, RRCConnectionResumeRequest), the base station send response message of the RRC message through the PDSCH resource granted by the PDCCH scrambled with the UE specific RNTI. The response message of the RRC message indicates that the UE enters the RRC connection state or RRC idle state. The specific correspondence of the response message is as follows:

| RRC message | Response Messages for RRC messages | UE's target status |
|---|---|---|
| RRCConnectionRequest | RRCConnectionSetup | RRC Connection Status |
| RRCConnectionResumeRequest(UP) | RRCConnectionResume(UP) | RRC connection status |
| | RRCConnectionRelease(UP-EDT) | RRC Idle State |
| RRCEarlyDataRequest (CP-EDT) | RRCEarlyDataComplete(CP-EDT) | RRC idle state |

Example 10. In conjunction with Examples 6-7, which is characterized in that the base station indicates the UE to stop Paging monitoring through PDCCH DCI scrambled with the UE specific RNTI or MAC CE over the PDSCH resource granted by the PDCCH scrambled with the UE specific RNTI. The indication indicated can be an explicit indication or implied indication of an information bit, such as: The predefined default method is used if there is not explicit indication, or when the DCI triggers a DL grant, the indication is seemed as be sent by default, and the indication will be seemed as be sent by default when the paging interval is larger than the USS_IDLE interval.

Example 11. In conjunction with Example 10, wherein the indication is for at least one of the following:
 (a) Instruct the UE to discard the next 1 or more opportunities to listen for paging messages.
 (b) Instruct the UE to abandon the opportunity to listen for paging messages in the next 1 time window. The length of this time window can be specified by standard or by DCI.

Example 12. In conjunction with Example 2, the feature is that if the preconfigured dedicated resource is a preamble resource (CFRA Resource), the base station detects the corresponding preamble in the preconfigured CFRA resource location.

Example 13. In conjunction with Example 12, wherein if the base station detects the corresponding Preamble in the pre-configured CFRA resource location, the base station grants the PUSCH resource for the UE by using PDCCH scrambled with the UE-specific RNTI; the UE enters the RRC connected state or state indicated by the eNB.

Example 14. In conjunction with Example 12, it is characterized in that if the base station detects the corresponding preamble in the preconfigured CFRA resource location, the base station grants the PDSCH resource by PDCCH scrambled with the RA-RNTI, and the base station send a RAR (Random Access Response) message on the PDSCH. The UE enters the state of the RRC connection state or eNB indicated.

Example 15. In conjunction with Example 14, wherein the base station grants PUSCH and/or PDSCH resource on the UE based on the C-RNTI scrambled PDCCH. The UE enters an RRC connected state or a state indicated by the eNB.

Example 16. In conjunction with Examples 4, 6-9 and 13-15, the method is characterized in that when the UE in the RRC connection state releasing the RRC connection, the base station instructs the UE to the RRC release method. The methods described include at least one of the following: releasing the RRC connection and CONTEXT, UE context suspend, UE context suspend and preconfigured idle mode dedicated resources.

Example 17. In conjunction with Example 16, wherein if the manner of releasing the RRC connection is "UE context suspension and pre-configured idle mode dedicated resources", the base station needs to pre-configure idle mode dedicated resources for the UE. If the current RRC connection does not configure the idle mode dedicated resource in the UE, the UE adopts the idle mode dedicated resource configured to the UE in the latest RRC connection state.

Example 18. In conjunction with Example 16, it is characterized in that the RRC connection release may be carried out in any of the following ways:
 (a) Timer-based RRC connection release
 (b) RRC Connection release based on PDCCH DCI instructions
 (c) RRC connection release based on RRC message
 (d) RRC connection release based on MAC CE indication Example 19. In conjunction with Example 18, wherein if the RRC connection release is based on a Timer trigger, the Timer is started after the data transmission and/or reception is completed. If the Timer expires and there is no uplink and downlink data transmission and reception, the idle state is entered; before the Timer is started: the eNB needs to configure the Timer-based RRC connection release information, such as the Timer length, the RRC connection release method, and the like. The Timer-based RRC connection release information may be configured in any of the following manners:
 Send to the terminal via RRCConnectionSetup message
 Send to the terminal through the RRCConnectionResume message
 Send to the terminal through the RRCConnectionRelease message
 Send to the terminal via RRCConnectionReestablishment message
 Send to the terminal through the RRCEarlyDataComplete message
 Send to the terminal via RRCConnectionReconfiguration message
 Send to the terminal via a new Data Transmission Complete indication message
 Send to the terminal through the downlink MAC CE
 Send to the terminal through the PDCCH DCI sent to the terminal Example 20. In conjunction with Example 18, wherein if the RRC connection release is triggered based on a PDCCH DCI indication or triggered based on a MAC CE indication, the eNB sends a PDCCH DCI or MAC CE indicating the release of the RRC connection to the UE.

Before sending an indication indicating the release of the RRC connection or in the indication information: the eNB needs to configure the RRC connection release method for the UE. The RRC connection release method may be configured in the following manner before the sending the indication indicating that the RRC connection is released:
 Send to the terminal via RRCConnectionSetup message
 Send to the terminal through the RRCConnectionResume message
 Send to the terminal through the RRCConnectionRelease message
 Send to the terminal via RRCConnectionReestablishment message
 Send to the terminal through the RRCEarlyDataComplete message
 Send to the terminal via RRCConnectionReconfiguration message
 Send to the terminal via a new Data Transmission Complete indication message
 Send to the terminal through the downlink MAC CE
 Send to the terminal through the PDCCH DCI sent to the terminal Example 21. In conjunction with Example 18, it is characterized in that if the RRC connection release is based on a RRC message trigger, eNB sends a RRC connection release message to the UE to trigger the RRC connection release.

Example 22. In conjunction with Example 21, wherein the RRC connection release message comprises any of the following messages:
 RRCEarlyDataComplete
 RRCConnectionRelease
 A new Data Transmission Complete indication message
 The message contains an indication of the RRC connection release method.

Example Embodiments for Terminal Operation

Example 101. The UE monitors the UE-specific search space (USS_IDLE) of the idle mode data transmission phase and/or sends uplink information to the base station in the idle mode pre-configured resource time-frequency location. At this time, the UE is in the RRC idle mode based on the pre-configured resource data.

For a UE that is in a data transmission state in an idle mode, and which uses pre-configured dedicated resources, at least the following behavior is performed:

Network-side:
  (a) Information interaction with UE based on the pre-configured dedicated resources for idle mode data transmission.

UE-side:
  (a) Information interaction with UE based on the pre-configured dedicated resources for idle mode data transmission.
  (b) Monitoring Idle mode user dedicated search space (USS_IDLE)
  (c) Perform UE identification based on pre-configured dedicated resources Example 102. In conjunction with Example 101, wherein the idle mode pre-configured dedicated resource is a dedicated resource configured by the base station for fast data transmission for the RRC idle state UE. The dedicated resource includes at least one of the following resources:
  (a) UE-dedicated search space in the idle mode data transfer phase (USS_IDLE)
  (b) PUSCH resources
  (c) Contention-free Preamble resources (CFRA resources)

Example 103. In conjunction with Example 102, wherein if the pre-configured dedicated resource is a USS_IDLE resource, the UE monitors the PDCCH at the USS_IDLE resource location, and the PDCCH DCI can be used for at least one of the following purposes:
  (a) Confirming the uplink information sent by the UE in the idle mode pre-configured dedicated resource
  (b) Instructing the UE to enter the RRC idle state
  (c) Instructing the UE to enter the RRC connection state
  (d) Instructing the UE to enter the DRX state of the RRC idle mode based on the data transmission state of the pre-configured resource
  (e) PUSCH resource scheduling for the UE (UL Grant)
  (f) PDSCH resource scheduling (DL Grant) for the UE
  (g) Instruct UE to initiate PRACH process (PDCCH order)

Example 104. In conjunction with Example 103, it is characterized in that the PDCCH DCI of the USS_IDLE is scrambled by the UE-specific RNTI or the RA-RNTI corresponding to the CFRA resource.

Example 105. In conjunction with Examples 103-104, characterized in that if the UE monitors PDCCH DCI of the USS_IDLE is scrambled by the UE-specific RNTI or the RA-RNTI corresponding to the CFRA resource, perform the following operations:
  (a) If the UE monitors the positive or negative acknowledge for the information sent, to decide whether to retransmit the information based on the acknowledge information
  (b) If the UE monitors the PDCCH DCI indicating that the UE enters the RRC connected state, the UE enters an RRC idle state
  (c) If the UE monitors the PDCCH DCI that directs the UE into the RRC connection state, the UE enters the RRC connection state
  (d) If the UE monitors the PDCCH DCI that directs the UE into the preconfigured resource data transfer DRX state in the RRC idle mode, the UE enters the DRX state. The UE in the DRX state does not perform PDCCH monitoring (including css-paging PDCCH or USS PDCCH)
  (e) If the UE monitors the PDCCH DCI for scheduling PUSCH resource (UL Grant) for the UE, the UE performs PUSCH transmission at the scheduled PUSCH resource location
  (f) If the UE monitors the PDCCH DCI for scheduling PDSCH resource (DL Grant) to UE, the UE performs PDSCH reception and/or monitor in the scheduled PDSCH resource location
  (g) If the UE monitors a PDCCH DCI indicating that the UE initiates a PRACH procedure (PDCCH Order), the UE initiates a PRACH procedure based on the PDCCH Order indication Example 106. In conjunction with Example 102, it is characterized in that if a preconfigured dedicated resource is a PUSCH resource and the UE has PUSCH send requirements, the UE sends PUSCH channel at the preconfigured PUSCH resource location. The PUSCH carries SRB and/or DRB.

Example 107. In conjunction with Example 106, wherein the UE monitors the PDCCH on the corresponding USS_IDLE after the PUSCH transmission is completed.

Example 108. In conjunction with Example 107, the method is characterized in that if the UE monitors the PDCCH DCI scrambled by UE specific RNTI, the competition resolution completes (UE recognition succeeds), and the UE enters the RRC connection state or the ENB indicated state.

Example 109. In conjunction with Example 107, it is characterized in that if the UE monitors an indication indicate the UE to enter a new state through the PDCCH DCI scrambled with the UE specific RNTI, or sent to the UE through PDSCH or MAC CE over the DL resource granted by PDCCH scrambled with UE specific RNTI, the UE enters the new state. The new state includes at least one of the following: RRC connection state, RRC idle state, data transmission DRX state in RRC idle mode based on pre-configured resource, The indication can be an explicit indication or an implicit indication by a certain information bite.g. (the predefined default method is used if there is not explicit indication).

Example 109-1. In conjunction with Example 109, characterized in that, if the UE can be explicitly instructed to enter the RRC connected state, but the UE has not received the explicit indication, the UE will enter the RRC idle state by default after the USS_IDLE search space monitoring finished.

Example 109-2. In conjunction with Example 109, it is characterized in that if the UE can be explicitly instructed to enter the RRC idle state, but if the UE has not received the explicit indication, the UE enters the RRC connection state by default after the USS_IDLE search space Monitor completes.

Example 109-3. In conjunction with Example 109, wherein: if the base station can explicitly indicate that the UE enters the data transmission DRX state in RRC idle mode based on the pre-configured resource, but the UE has not received the explicit indication, The UE enters in the recent state before entering the USS_IDLE monitoring state by default after the USS_IDLE search space monitoring finished.

Example 109-4. In conjunction with Example 109, the example is characterized in that if the base station can explicitly indicate the target state of the UE, but if the UE does not send the explicit indication, the UE keeps the current state by default (monitoring the current PDCCH search space).

Example 110. In conjunction with Example 106, the method is characterized in that if the UE sends PUSCH channel information in a pre-configured PUSCH resource location and PUSCH carries an RRC message containing a dedicated NAS PDU information (the message contains at least one of the following: RRCConnectionRequest, RRCEarlyDataRequest) or contains user level data PDU and RRC messages (the message contains at least one of the following: RRCConnectionRequest, RRCConnectionResumeRequest), the UE monitors the response message of the RRC message through the PDSCH resource granted by the PDCCH scrambled with the UE specific RNTI. The response message of the RRC message indicates that the UE enters the RRC connection state or RRC idle state. The specific correspondence of the response message is the following table:

| RRC message | Response Messages for RRC messages | UE's target status |
| --- | --- | --- |
| RRCConnectionRequest | RRCConnectionSetup | RRC Connection Status |
| RRCConnectionResume Request(UP) | RRCConnectionResume(UP) | RRC connection status |
| | RRCConnectionRelease(UP-EDT) | RRC Idle State |
| RRCEarlyDataRequest (CP-EDT) | RRCEarlyDataComplete(CP-EDT) | RRC idle state |

Example 111. In conjunction with Example 106, wherein if the UE transmits the PUSCH channel information in the pre-configured PUSCH resource location, and does not receive the response message of the eNB within a predefined time period, the UE seems that the PUSCH transmission fails on the pre-configured PUSCH resource location, and initiates a contention based random access procedure.

Example 112. In conjunction with Examples 107-108, which is characterized in that the base station indicates the UE to stop Paging monitoring through PDCCH DCI scrambled with the UE specific RNTI or MAC CE over the PDSCH resource granted by the PDCCH scrambled with the UE specific RNTI. The indication indicated can be an explicit indication or implied indication of an information bit. The predefined default method is used if there is not explicit indication, or when the DCI triggers a DL grant, the indication is seemed as be sent by default, and the indication will be seemed as be sent by default when the paging interval is larger than the USS_IDLE interval Example 113. In conjunction with Example 112, wherein the indication is for at least one of the following:
(a) Instruct the UE to discard the next 1 or more opportunities to listen for paging messages.
(b) Instruct the UE to abandon the opportunity to listen for paging messages in the next 1 time window. The length of this time window can be specified by standard or by DCI.

Example 114. In conjunction with Example 102, the feature is that if the preconfigured dedicated resource is a preamble resource (CFRA Resource) and the UE has uplink information to send the demand, the UE sends preamble at the preconfigured CFRA resource location.

Example 115. In conjunction with Example 114, wherein if the UE sends the Preamble in the pre-configured CFRA resource location, the UE starts monitoring PDCCH scrambled by UE Specific RNTI or RA-RNTI corresponding to the CFRA resource.

Example 116. In conjunction with Example 115, it is characterized in that if the UE received the PDCCH scrambled by UE Specific RNTI or RA-RNTI corresponding to the CFRA resource, or UE received C-RNTI carried over RAR or MAC CE on the PDSCH resources granted through the PDCCH, the competition is completed (UE recognition completed), the UE enters into the RRC connection status or the state of the ENB instructions.

Example 117. In conjunction with Example 116, wherein the UE monitors the C-RNTI scrambled PDCCH, and performs data transmission and reception on the PDCCH authorized resource.

Example 118. In conjunction with Example 115, its characteristic is: if the UE receives the PDCCH scrambled with RA-RNTI corresponding to the CFRA resources, and receives the RAR message on the PDSCH Resources granted by the PDCCH, then the UE send C-RNTI MAC CE on the uplink grant resource carried in the RAR message.

Example 119. In conjunction with Example 118, characterized in that: if the C-RNTI scrambled PDCCH is received within a predefined time after the UE sends the C-RNTI MAC CE, the contention resolution is completed (the UE identification is completed). The UE enters an RRC connected state or a state indicated by the eNB.

Example 120. In conjunction with Example 119, wherein the UE monitors the C-RNTI scrambled PDCCH and performs data transmission and reception on the PDCCH authorized resource.

Example 121. In conjunction with Examples 108, 116 and 119, it is characterized in that: when the UE in the RRC connection state releasing the RRC connection, the RRC connection is released based on the RRC release method received from the base station. The RRC connection release method includes at least one of the following: the release of the RRC connection and the context, the UE context suspend, the UE context suspend and the preconfigured idle mode dedicated resource.

Example 122. In conjunction with Example 121, wherein if the method of releasing the RRC connection is "UE context suspension and pre-configured idle mode dedicated resources", the UE receives pre-configured idle mode dedicated resources from the base station before the RRC connection is released. if the current RRC connection does not configure the idle mode dedicated resource in the UE, the UE adopts the idle mode dedicated resource configured to the UE in the latest RRC connection state.

Example 123. In conjunction with Example 121, it is characterized in that the RRC connection release may be carried out in any of the following ways:
(a) Timer-based RRC connection release
(b) RRC Connection release based on PDCCH DCI instructions
(c) RRC connection release based on RRC message
(d) RRC connection release based on MAC CE indication Example 124. In conjunction with Example 123, it is characterized in that if the RRC connection is released based on a timer trigger, the timer is started after the UE data is sent and/or received. If the timer expires and there is no incoming or outgoing data, the UE goes to idle state; before the timer is started: the UE needs to receive timer length from eNB configuration, RRC connection release mode, and so on timer based RRC connection release information. The RRC connection release information based on timer can be configured in any of the following ways:

Send to the terminal via RRCConnectionSetup message
Send to the terminal through the RRCConnectionResume message
Send to the terminal through the RRCConnectionSetup message
Send to the terminal through the RRCConnectionRelease message
Send to the terminal via RRCConnectionReestablishment message
Send to the terminal through the RRCEarlyDataComplete message
Send to the terminal via RRCConnectionReconfiguration message
Send to the terminal via a new Data Transmission Complete indication message
Send to the terminal through the downlink MAC CE
Send to the terminal through the PDCCH DCI sent to the terminal Example 125. In conjunction with Example 123, it is characterized in that if the RRC connection is released based on the PDCCH DCI instruction trigger or triggered based on a MAC CE indication, the UE releases the RRC connection based on the PDCCH DCI or MAC CE received which carries the RRC connection release instructions. Before receiving the RRC connection release instructions or in the indication message: The UE receives RRC connection release mode from the eNB configured. The RRC connection release method that is configured for UE before receiving a RRC connection release indication can be configured in any of the following ways:

Send to the terminal via RRCConnectionSetup message
Send to the terminal through the RRCConnectionResume message
Send to the terminal through the RRCConnectionRelease message
Send to the terminal via RRCConnectionReestablishment message
Send to the terminal through the RRCEarlyDataComplete message
Send to the terminal via RRCConnectionReconfiguration message
Send to the terminal via a new Data Transmission Complete indication message
Send to the terminal through the downlink MAC CE
Send to the terminal through the PDCCH DCI sent to the terminal Example 126. In conjunction with Example 123, it is characterized in that if the RRC connection release is based on a RRC message, the UE releases the RRC connection based on the RRC message to trigger the RRC connection release.

Example 127. In conjunction with Example 126, it is characterized in that the RRC connection release message includes any of the following messages:

RRCEarlyDataComplete
RRCConnectionRelease
A new Data Transmission Complete indication message
The message contains an indication of the RRC connection release method.

Example 128. In conjunction with Examples 103, 106 and 114, the method is characterized in that if the UE preconfigured the dedicated resource location in idle mode during the predefined time period, no uplink information (PUSCH or preamble) is sent, and no dedicated PDCCH to the base station is monitored. Then the UE enters the RRC idle state or idle mode based on the DRX state of the predefined resource data transfer state.

Example 129. In conjunction with Example 101, it is characterized in that, if the UE receives the base station for UE preconfigured idle mode dedicated resources, and the UE in the RRC idle state of the community re-election (moved to other communities), or an overlay enhancement level change has occurred (moved to a higher coverage level in the cell, for example, a wireless overlay is worse), the UE needs to automatically release the preconfigured resources and initiate a competitive random access process when the data is sent and received at the time of the pre-configured resource.

Example 130. In conjunction with Example 129, the method is characterized in that the UE carries the source cell identity (e.g., Cell Global Identity (CGI)) and UE identification (S-TMSI or UE specific rnti) of the preconfigured resources to ENB in the Msg3 of the competitive random access process, Used to notify the source cell to release pre-configured dedicated resources.

Example Methods of the Disclosed Technology

Figure 10A:
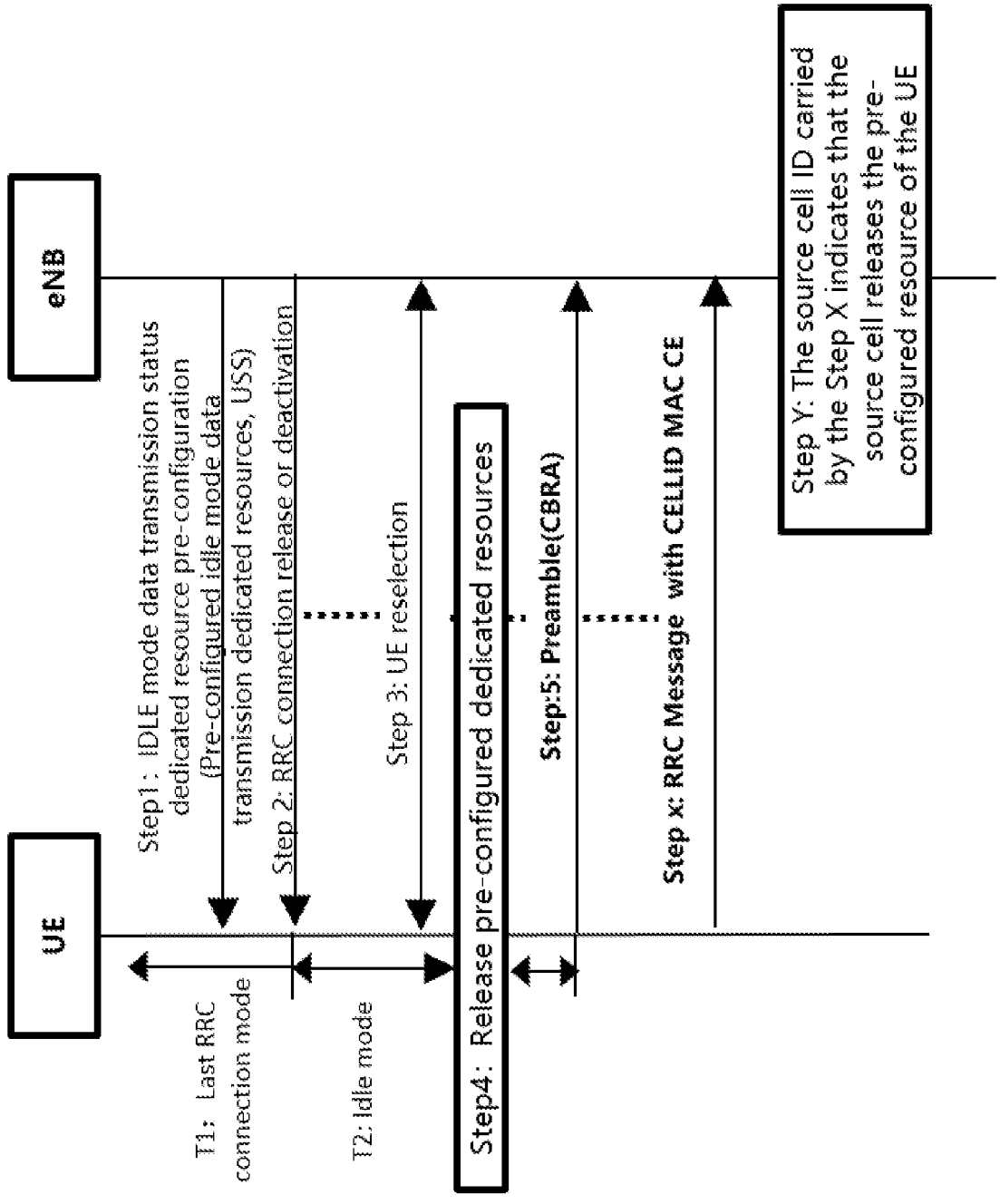
FIGS. 10A and 10B show example message/timing diagrams of resource release when a cell in an idle mode pre-configured dedicated resource experiences a cell reselection or an enhanced coverage level change.
Figure 10B:
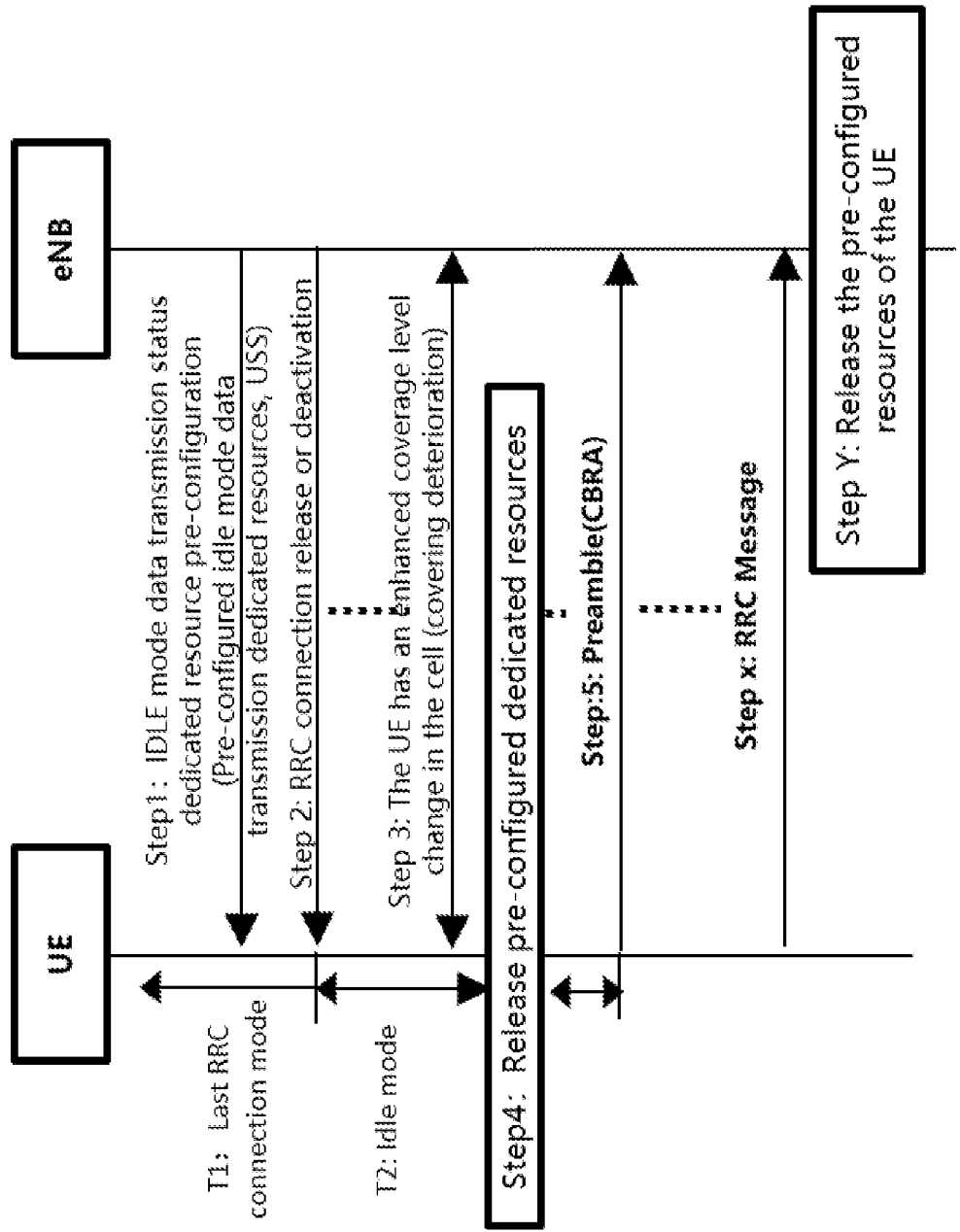
Figure 11:
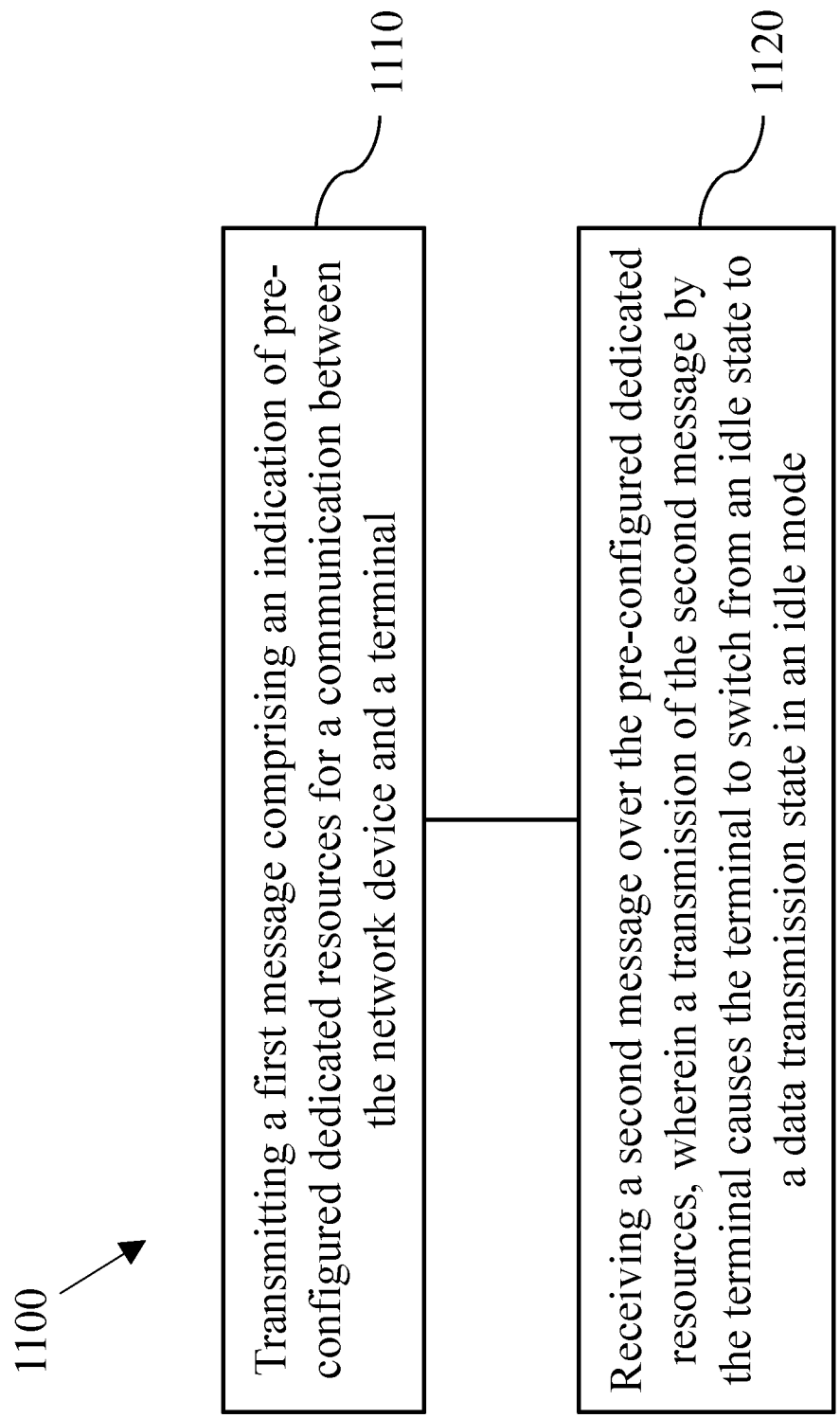
FIG. 11 shows an example of a wireless communication method, in accordance with some embodiments of the presently disclosed technology.
Figure 12:
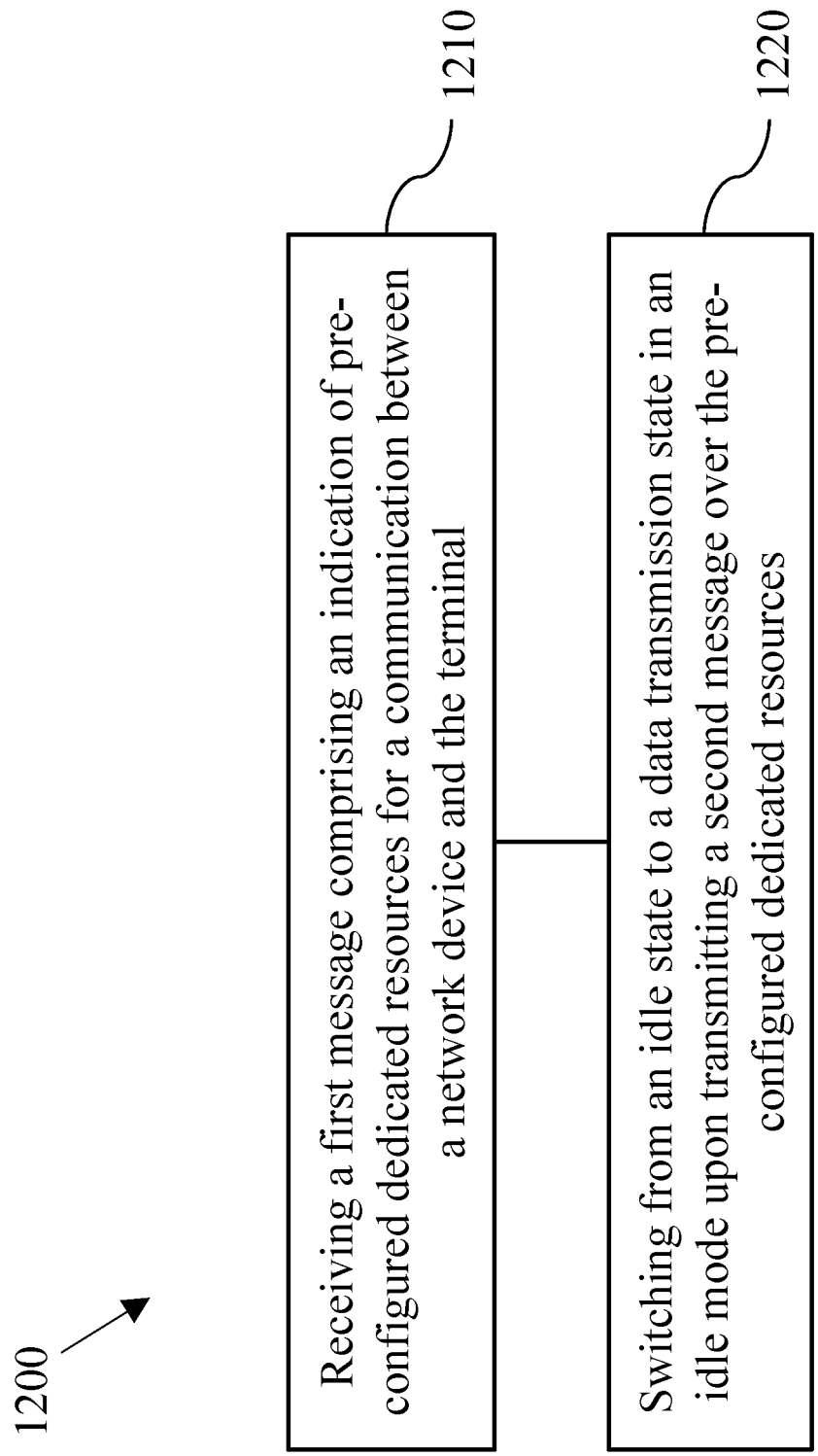
FIG. 12 shows an example of another wireless communication method, in accordance with some embodiments of the presently disclosed technology.

The example embodiments for base station and terminal operation are further elucidated in the context of the message/timing diagrams shown in FIGS. 2-10 and the methods described in FIGS. 11 and 12.

Figure 2:
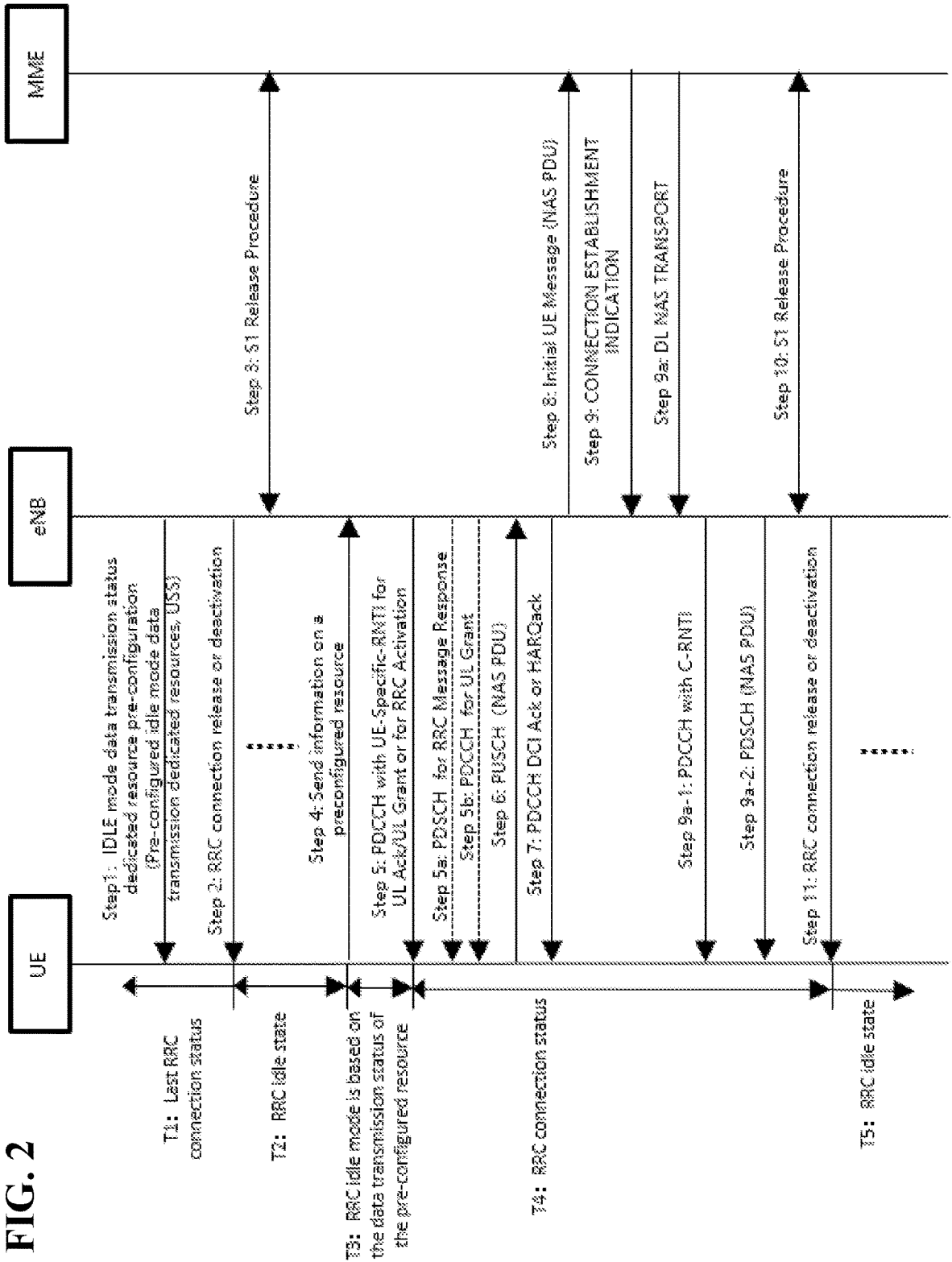
FIG. 2 shows an example message/timing diagram of an uplink data transmission process and state transitions of the control plane (CP) scheme based on the idle mode pre-configured dedicated resources.

FIG. 2 shows an example message/timing diagram of an uplink data transmission process and state transitions of the control plane (CP) scheme based on the idle mode pre-configured dedicated resources. As shown in FIG. 2, the example message and timing diagram includes:

Step 1: An eNB sends a dedicated resource that is preconfigured to the UE for idle mode data transfer during the last RRC connection, also known as the T1 time period. The dedicated resource includes at least one of the following resources:
UE dedicated search space for free mode data transfer phase (USS_IDLE)
PUSCH resources
Non-competitive preamble resources (CFRA resources)

Step 2: When the RRC connection is released or deactivated, the UE enters an idle state. This is the T2 period. The RRC connection release or de-activation may be performed by a Timer, DCI, RRC message, or MAC CE, as follows:
Timer-based release: Start the Timer after the data is sent and/or received. If the timer expires and there is no uplink and downlink data transmission and/or reception, the idle state is entered. Before the Timer is started, the eNB configures the Timer length to the UE through the RRC message and RRC release mode (e.g., RRC release and context release, RRC connection suspension, or idle mode dedicated resource pre-configured state); see Example 107 for an exemplary configuration.

PDCCH DCI-based release: If the received DCI indicates that the RRC connection is released or deactivated, the UE enters an idle state wherein the PDCCH DCI carries the RRC release mode (e.g., RRC release and context release, RRC connection suspension, or idle mode dedicated resource pre-configured state). Alternatively, before the UE receives the DCI indicating the release or deactivation of the RRC connection, the eNB configures the RRC release mode (e.g., RRC release and context release, RRC connection suspension, or idle mode dedicated resource pre-configuration state) to the UE through the RRC message; for specific configuration methods see Example 108.

Release based on the MAC CE indication: If the UE receives the MAC CE indication that the RRC connection is released or deactivated, the UE enters an idle state wherein the MAC CE indication carries the RRC release mode (e.g., RRC release and context release RRC connection suspension, or idle mode dedicated resource pre-configuration state). Alternatively, before receiving the MAC CE indication, the eNB configures an RRC release mode (e.g., RRC release and context release, RRC connection suspension, or idle mode dedicated resource pre-configuration state) through the RRC message. For details, see Example 108.

Release based on RRC messages: If an RRC message is received that instructs the RRC connection to be released or activated, the UE enters an idle state after the RRC message is confirmed. In this state, the RRC message to release or to deactivate the RRC connection carries the RRC release mode (e.g., RRC release and context release, RRC Connection pending, or idle mode dedicated resource preconfigured state). For the specific configuration method, see Examples 109 and 110.

Step 3: S1 connection release

Step 4: A UE sends uplink information to an eNB at the time frequency of the preconfigured resource to enter the idle mode data transfer state. This is the beginning of the T3 period. The uplink information may be one of the following:

BSR carried on the PUSCH

NAS PDU hosted on PUSCH

RRC message carrying the dedicated NAS PDU information carried on PUSCH

The preamble of CFRA resources

If the uplink information includes the RRC message of the dedicated NAS PDU information (i.e., the message includes at least one of the following: RRCConnectionRequest or RRCEarlyDataRequest), the base station sends the response message of the RRC message by using the PDSCH scheduled by the PDCCH DCI scrambled by the UE Specific RNTI. The response message of the RRC message indicates that the UE enters an RRC connected state or an RRC idle state. The specific correspondence of response messages is as follows:

| RRC message | Response Messages for RRC messages | UE's target status |
|---|---|---|
| RRCConnectionRequest | RRCConnectionSetup | RRC Connection Status |
| RRCEarlyDataRequest (CP-EDT) | RRCEarlyDataComplete(CP-EDT) | RRC idle state |

Step 5: The UE receives the PDCCH scrambled by the UE Specific RNTI sent by the base station, the contention resolution is completed (i.e., the UE is successfully identified), and the UE enters the connection mode. At this point, the T3 period ends, and the T4 period starts.

Step 6-Step 11: The UE carries on the data transmission in the connection mode (with the T4 time period being similar to the T1 time period, the next T5 time and the T2 time period being similar, and so on)

Figure 3:
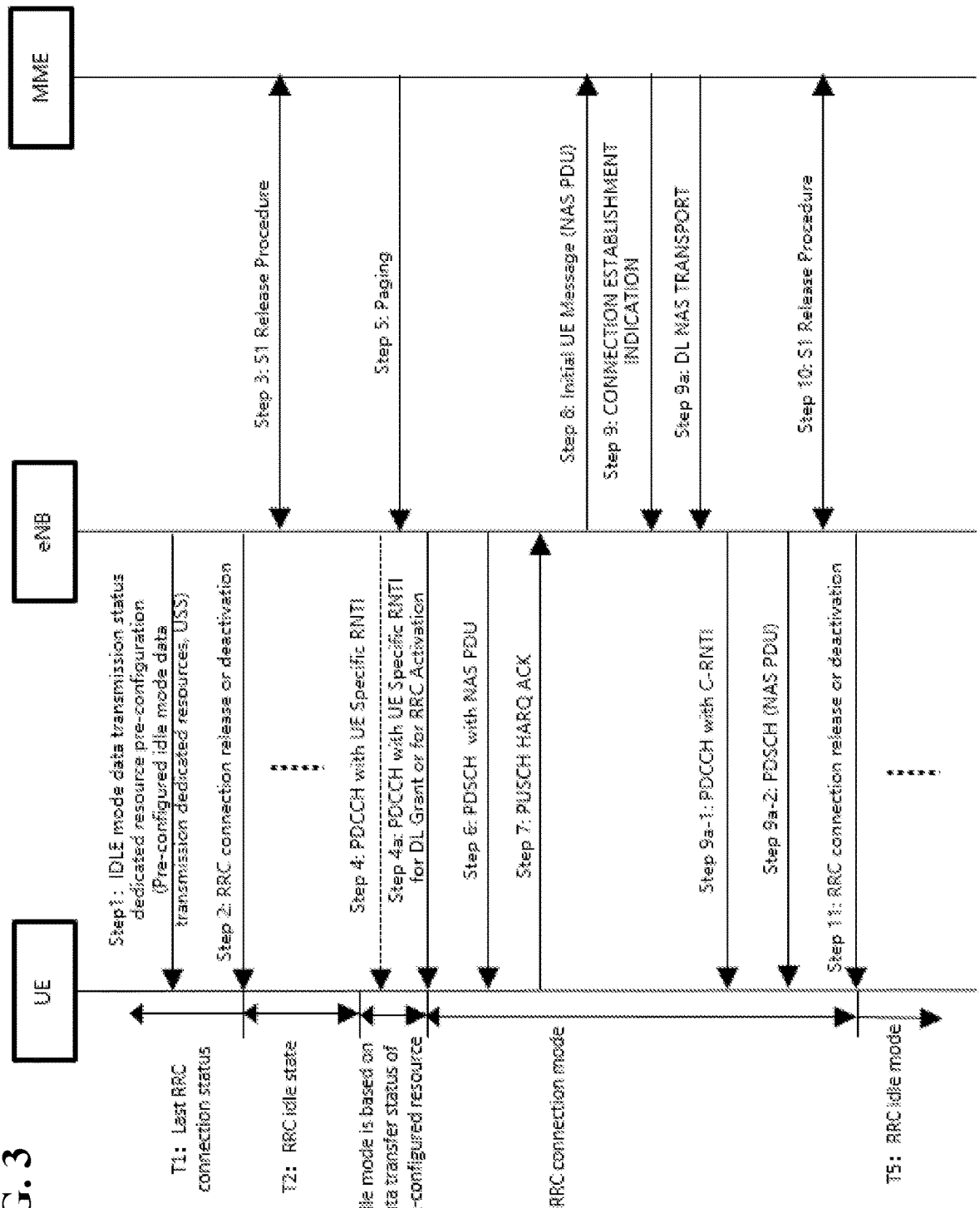
FIG. 3 shows an example message/timing diagram of a downlink data transmission process and state transitions of the CP scheme based on the idle mode pre-configured dedicated resources.

FIG. 3 shows an example message/timing diagram of a downlink data transmission process and state transitions of the CP scheme based on the idle mode pre-configured dedicated resources. One of the differences between this example and the one shown in FIG. 2 is:

Step 4: The UE starts monitoring the PDCCH scrambled by the UE Specific RNTI at the time-frequency location of the pre-configured resource at the start of the T3 period. (Note: the UE does not actively send the uplink information to the UE.)

Step 4a: When there is a need to send and receive data, the eNB proactively sends a UE specific RNTI scrambling PDCCH to the UE at the time frequency location of the preconfigured resource. The UE receives the PDCCH scrambled by the UE specific RNTI sent by the base station, the competition resolution completes (i.e., the UE identifies successfully), and the UE enters the connection mode. At this point, the T3 period ends and the T4 time period begins.

Figure 4:
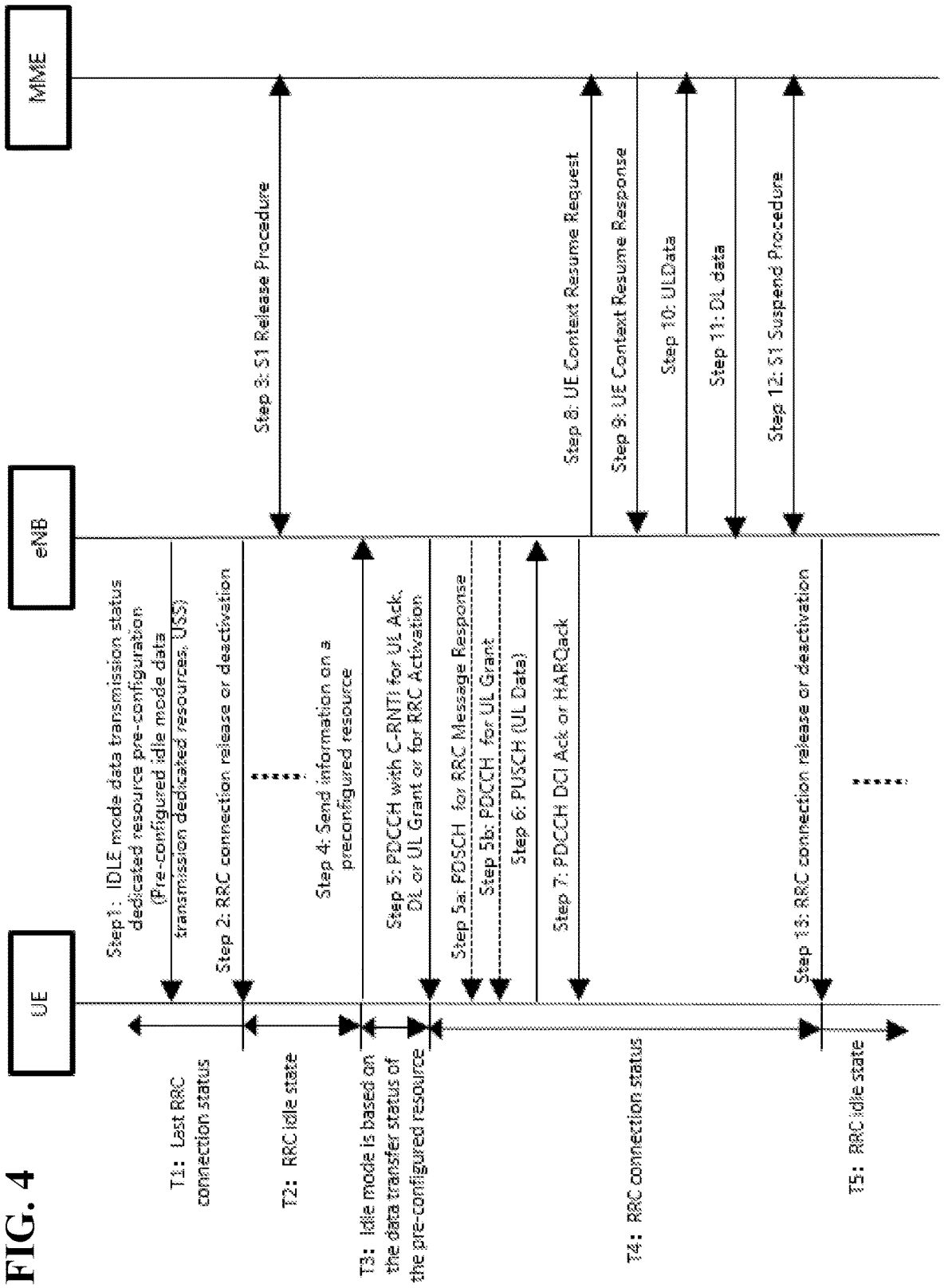
FIG. 4 shows an example message/timing diagram of an uplink data transmission process and state transitions of the user plane (UP) scheme based on the idle mode pre-configured dedicated resources.

FIG. 4 shows an example message/timing diagram of an uplink data transmission process and state transitions of the user plane (UP) scheme based on the idle mode pre-configured dedicated resources. This example is similar to that described in FIG. 2, except:

Step 4: The UE sends the uplink information to the eNB in the time-frequency position of the pre-configured resource, and enters the idle mode data transmission state (starting in the T3 period). The uplink information may be one of the following pieces of information:

As shown in FIG. 4, the example message and timing diagram includes:

The BSR is carried on the PUSCH

User data PDU carried on the PUSCH

RRC message and user data PDU information carried on PUSCH

Preamble of CFRA resources

If the uplink information contains a user-level data PDU and RRC message (the RRC message containing at least one of RRCConnectionRequest or RRCConnectionResumeRequest), the base station sends the response message of the RRC message (Step 5a) on the PDSCH resource scheduled by PDCCH (Step 5). The response message of the RRC message indicates that the UE enters the RRC connection state or RRC idle state. The specific correspondence of the response message is according to the following table:

| RRC message | Response Messages for RRC messages | UE's target status |
|---|---|---|
| RRCConnectionRequest | RRCConnectionSetup | RRC Connection Status |
| RRCConnectionResumeRequest(UP) | RRCConnectionResume(UP) | RRC connection status |
| | RRCConnectionRelease(UP-EDT) | RRC Idle State |

The signaling between the UE and the eNB of FIG. 2 carries the NAS PDU, and the present example carries the Data PDU between the UE and the eNB.

Steps 8 through 10 in FIG. 2 give the control plane (CP) signaling process, whereas Steps 8 through 12 in this example give the user plane (UP) signaling process.

Figure 5:
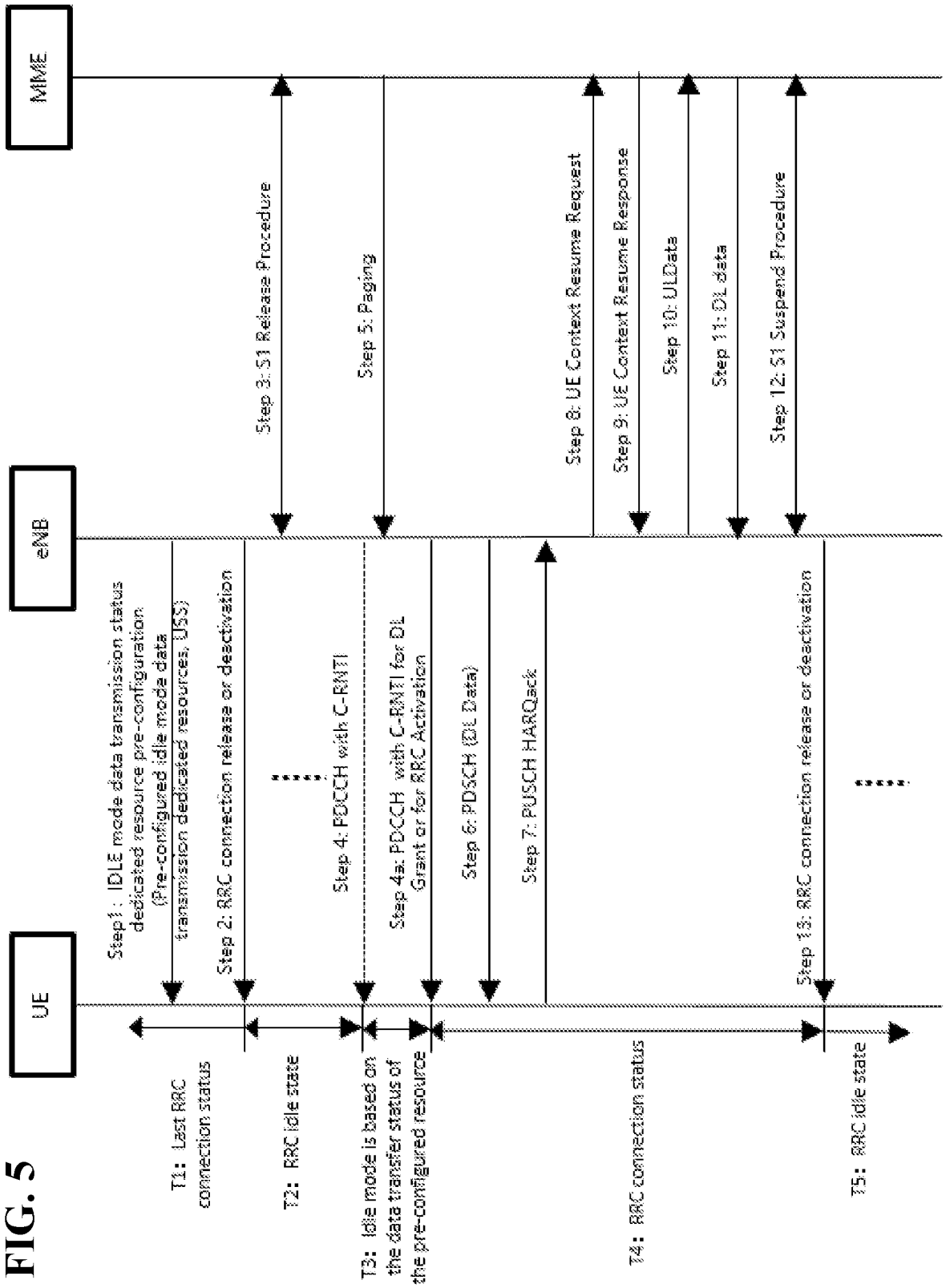
FIG. 5 shows an example message/timing diagram of a downlink data transmission process and state transitions of the UP scheme based on the idle mode pre-configured dedicated resources.

FIG. 5 shows an example message/timing diagram of a downlink data transmission process and state transitions of the UP scheme based on the idle mode pre-configured dedicated resources. This example is similar to that shown in FIG. 3, except that:

(a) The signaling between the UE and the eNB of FIG. 3 carries the NAS PDU, whereas the present example carries the Data PDU between the UE and the eNB.

(b) Step 8 to Step 10 of FIG. 3 are the CP signaling flow, whereas Step 8 to Step 12 of this example are the UP signaling flow.

Figure 6:
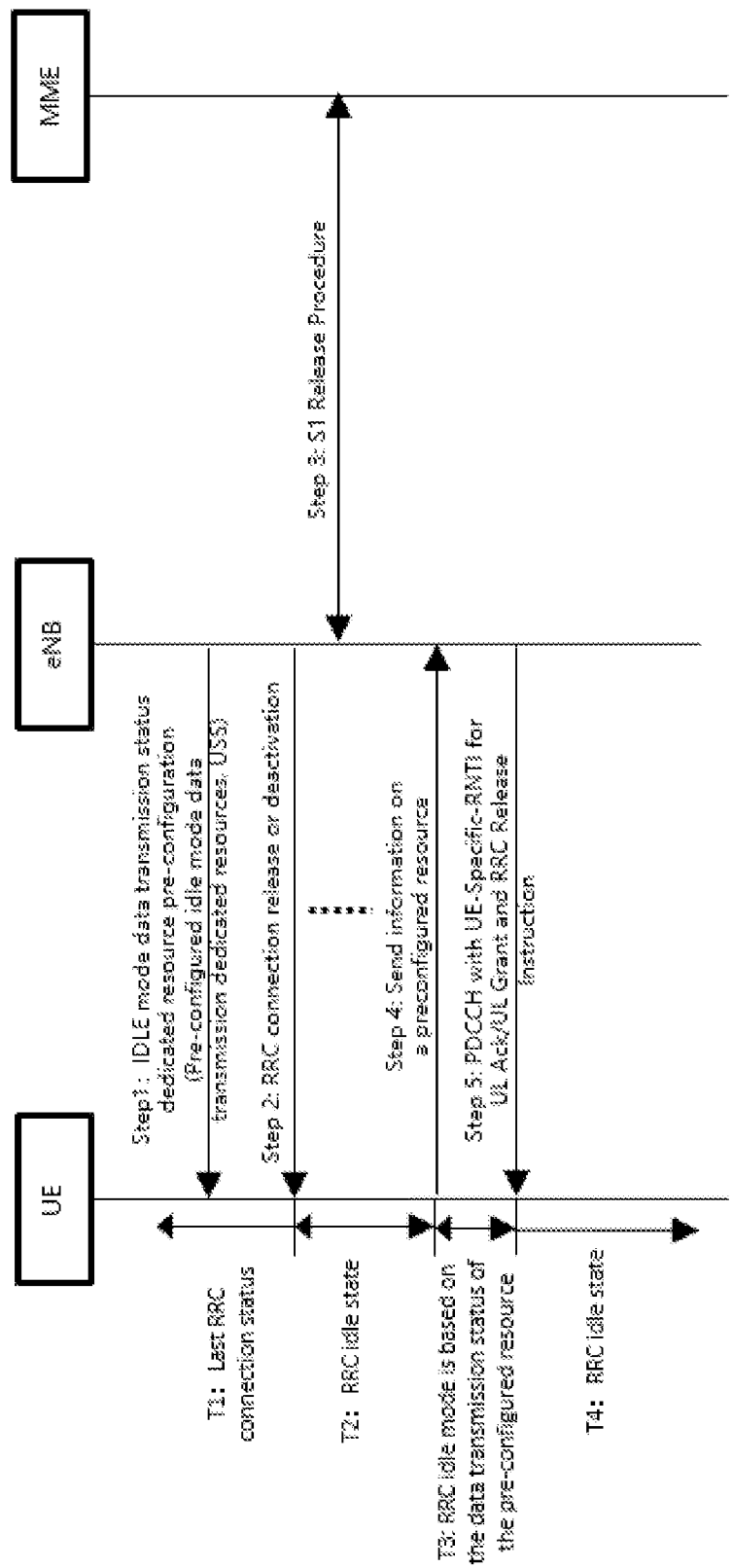
FIG. 6 shows an example message/timing diagram of a one packet transmission requirement, wherein the UE does not enter the connection mode.

FIG. 6 shows an example message/timing diagram of a one packet transmission requirement, wherein the UE does not enter the connection mode. The difference between this example and the one shown in FIG. 2 includes the following:

In FIG. 2, the UE completes the contention resolution in Step 5 (e.g., the UE is successfully identified), and the UE enters an RRC connected state. Whereas, in this example, the UE in the Step 5 competes to resolve the completion (i.e., UE identification success), the PDCCH scrambled with a UE-specific RNTI also carries RRC release instructions, and the UE enters the RRC idle state.

Figure 7:
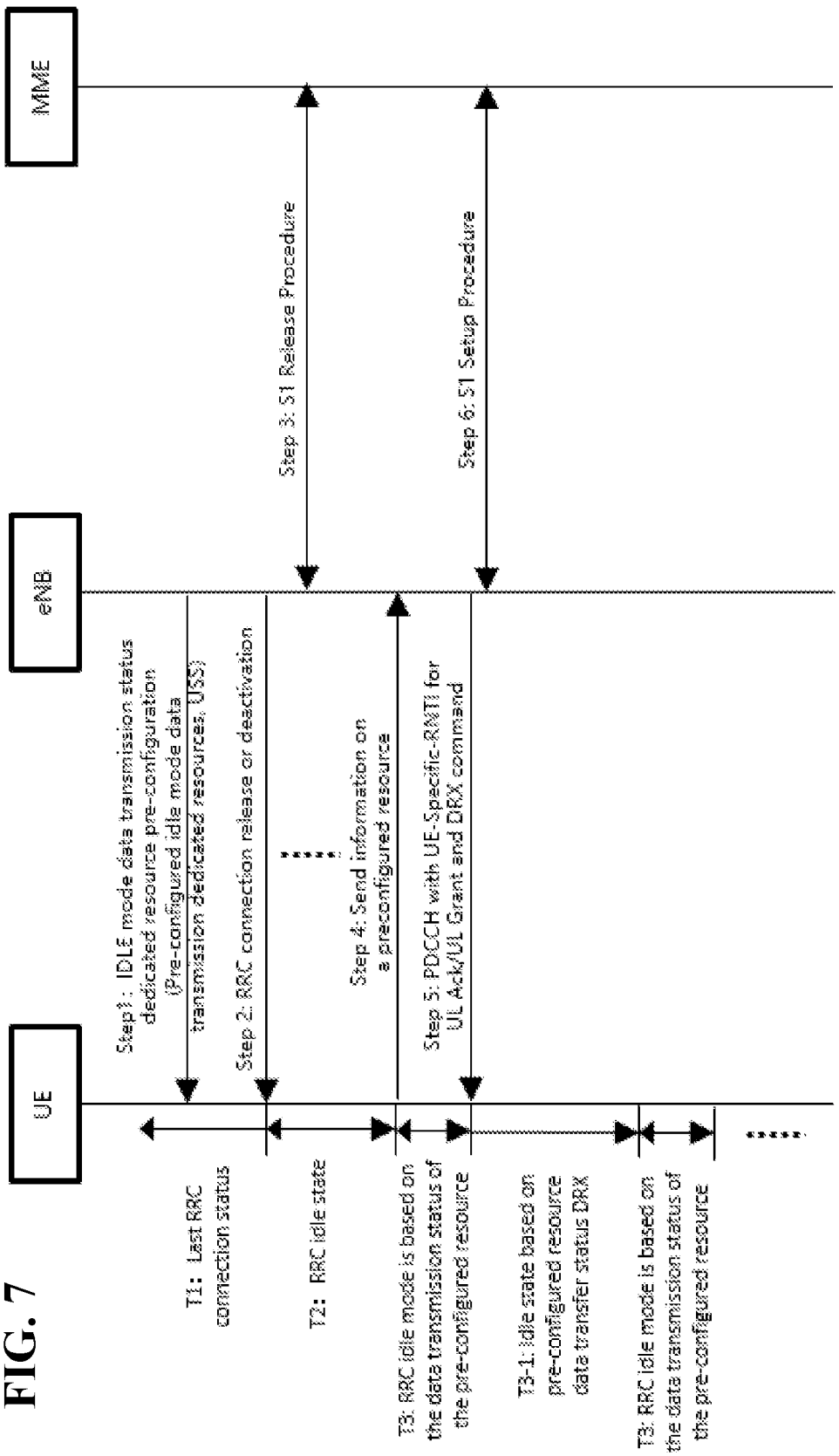
FIG. 7 shows an example message/timing diagram of a discontinuous reception (DRX) state, wherein a UE enters an idle mode pre-configured resource transmission state.

FIG. 7 shows an example message/timing diagram of a discontinuous reception (DRX) state, wherein a UE enters an idle mode pre-configured resource transmission state. The difference between this example and the one shown in FIG. 2 includes the following:

In FIG. 2, the UE completes the contention resolution in Step 5 (e.g., the UE is successfully identified), and the UE enters an RRC connected state. Whereas, in this example, the UE in Step 5 completes the contention resolution (i.e., UE identification success), PDCCH scrambled with UE specific RNTI also carries the indication which indicates the UE enter into the DRX state, and the UE enters the idle mode preconfigured resource data transmission DRX state.

Figure 8A:
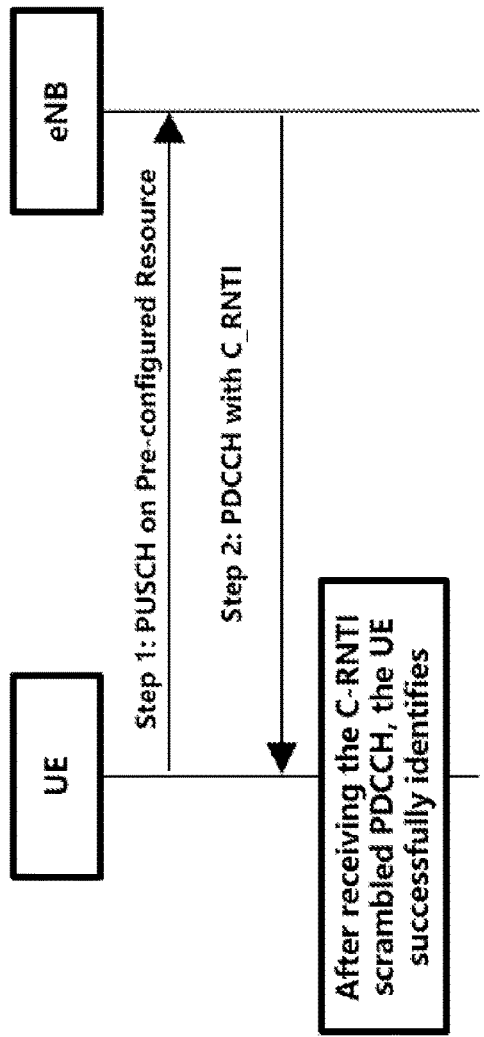
FIGS. 8A-8E show example message/timing diagrams of contention resolution (UE identification) based on idle mode pre-configured dedicated resources.

FIGS. 8A-8E show example message/timing diagrams of contention resolution (UE identification) based on idle mode pre-configured dedicated resources. As shown in FIG. 8A, which is an example of a contention resolution (i.e., UE identification) based on pre-configured dedicated PUSCH resources, the example message and timing diagram includes:

The UE sends uplink information to the eNB on pre-configured dedicated PUSCH resources; and The UE receives the PDCCH response scrambled by the C-RNTI (or other UE-Specific RNTI), and the contention resolution is completed (i.e., the UE is successfully identified).

Figure 8B:
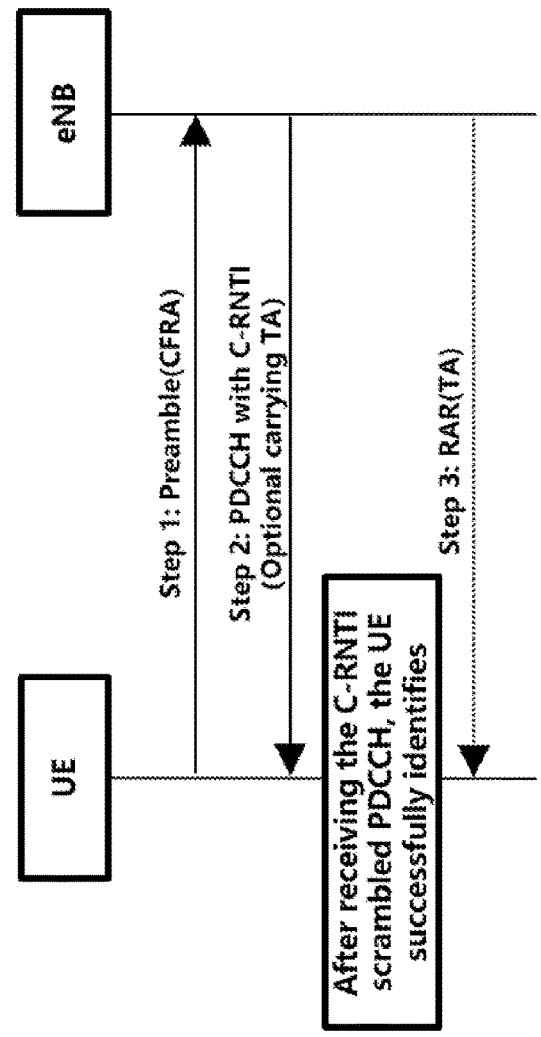

As shown in FIG. 8B, which is an example of contention resolution (i.e., UE identification) based on preconfigured dedicated CFRA resources, the example message and timing diagram includes:

The UE sends a preamble to the eNB on the pre-configured dedicated CFRA resource; and The UE receives the PDCCH response scrambled by the C-RNTI (or other UE-Specific RNTI), and the contention resolution is completed (i.e., the UE is successfully identified).

Figure 8C:
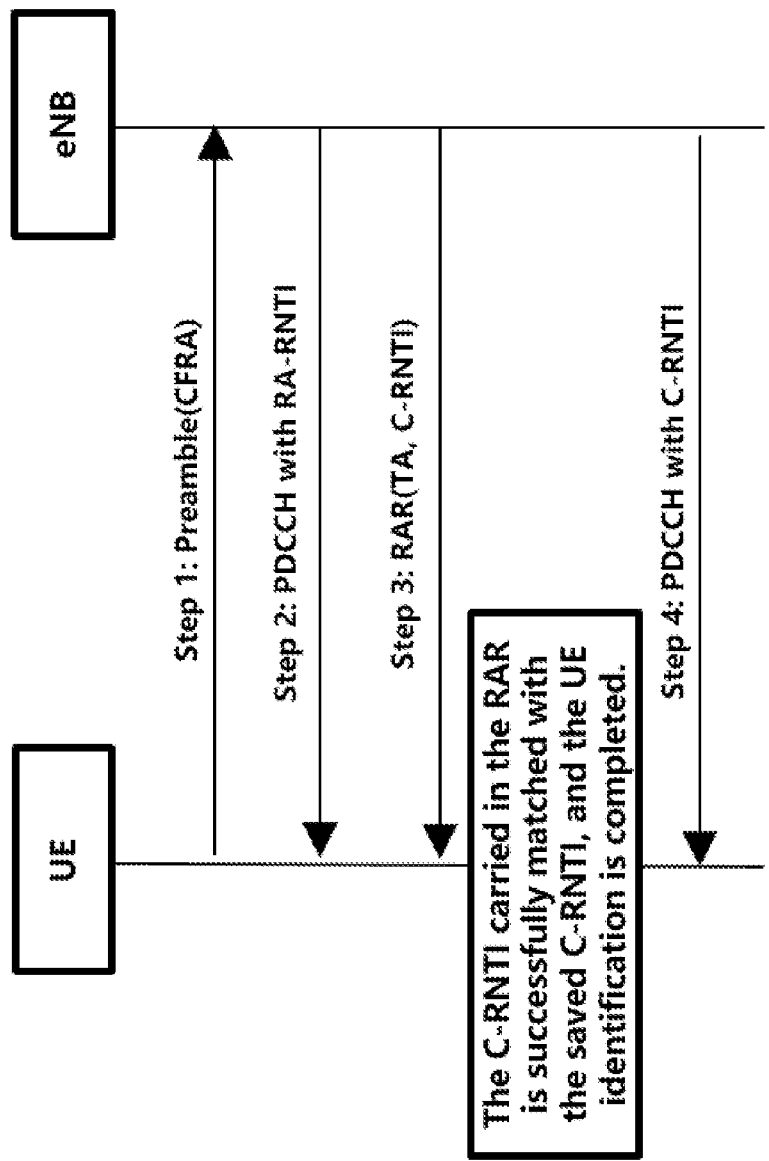

As shown in FIG. 8C, which is another example of contention resolution (i.e., UE identification) based on pre-configured dedicated CFRA resources, the example message and timing diagram includes:

The UE sends a preamble to the eNB on the pre-configured dedicated CFRA resource; and The UE receives the C-RNTI carried on the response message corresponding to the CFRA, and if the C-RNTI received matches the UE's C-RNTI, the competition resolution is completed (i.e., UE identification succeeds).

Figure 8D:
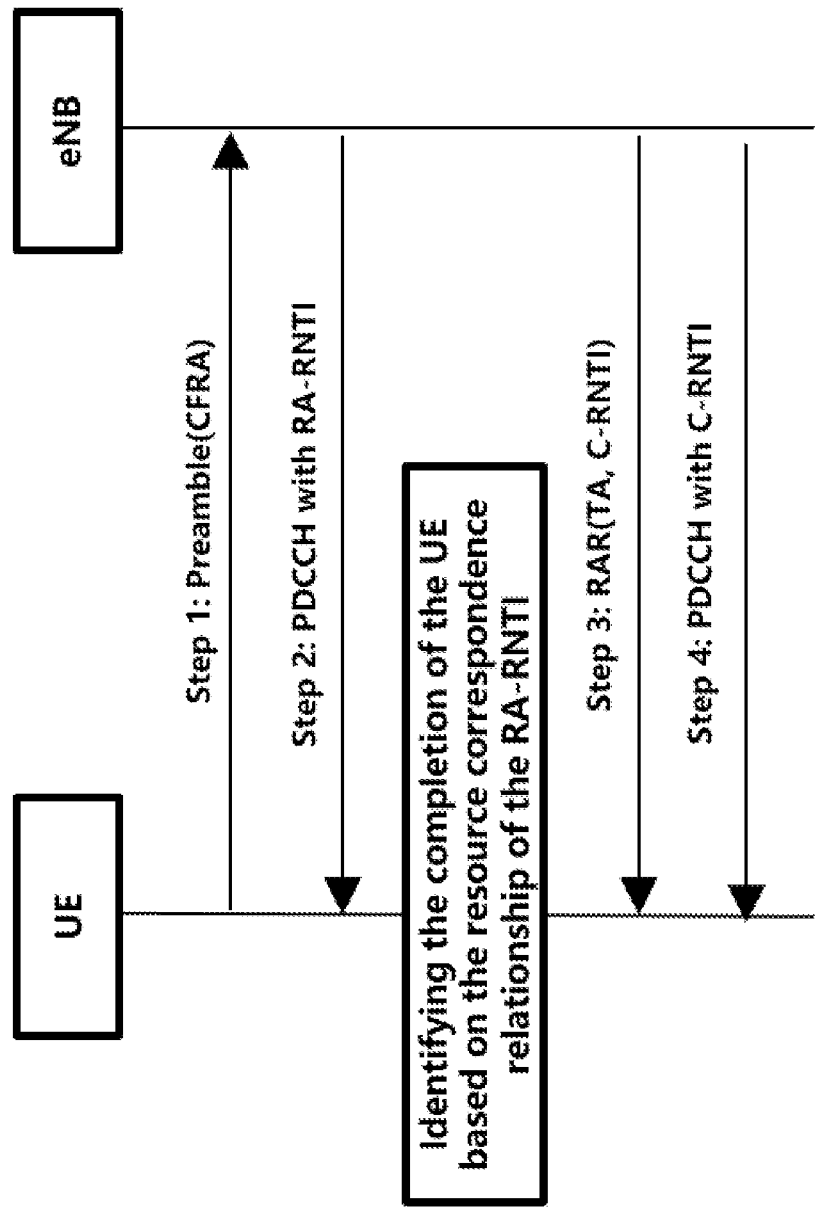

As shown in FIG. 8D, which is yet another example of a contention resolution (i.e., UE identification) based on pre-configured dedicated CFRA resources, the example message and timing diagram includes:

The UE sends a preamble to the eNB on pre-configured dedicated CFRA resources; and The UE receives the PDCCH response scrambled by RA-RNTI corresponding to the CFRA, and the contention resolution is completed (i.e., the UE identification succeeds).

Figure 8E:
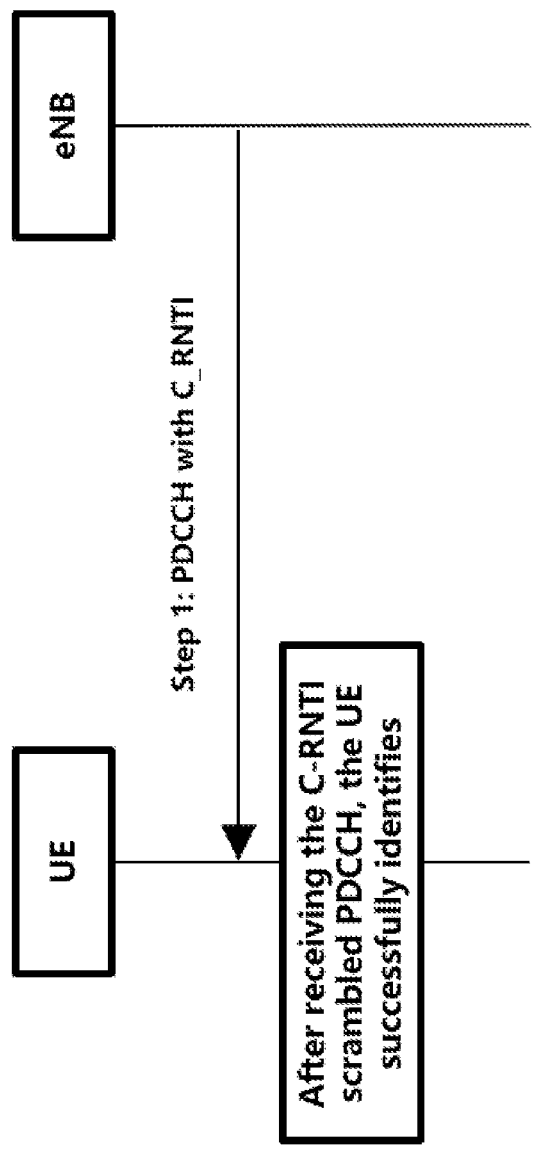

As shown in FIG. 8E, which is an example of competitive resolution (i.e., UE identification) based on a dedicated PDCCH, the example message and timing diagram includes:

The UE monitors the PDCCH at the preconfigured dedicated resource location, but does not send uplink information.

When there is a data transmission and reception requirement, the eNB actively sends a UE specific RNTI scrambled PDCCH to the UE in the USS of the pre-configured resource time-frequency location. The UE receives the PDCCH scrambled by the UE Specific RNTI sent by the base station, and the contention resolution is completed (i.e., the UE is successfully identified).

Figure 9A:
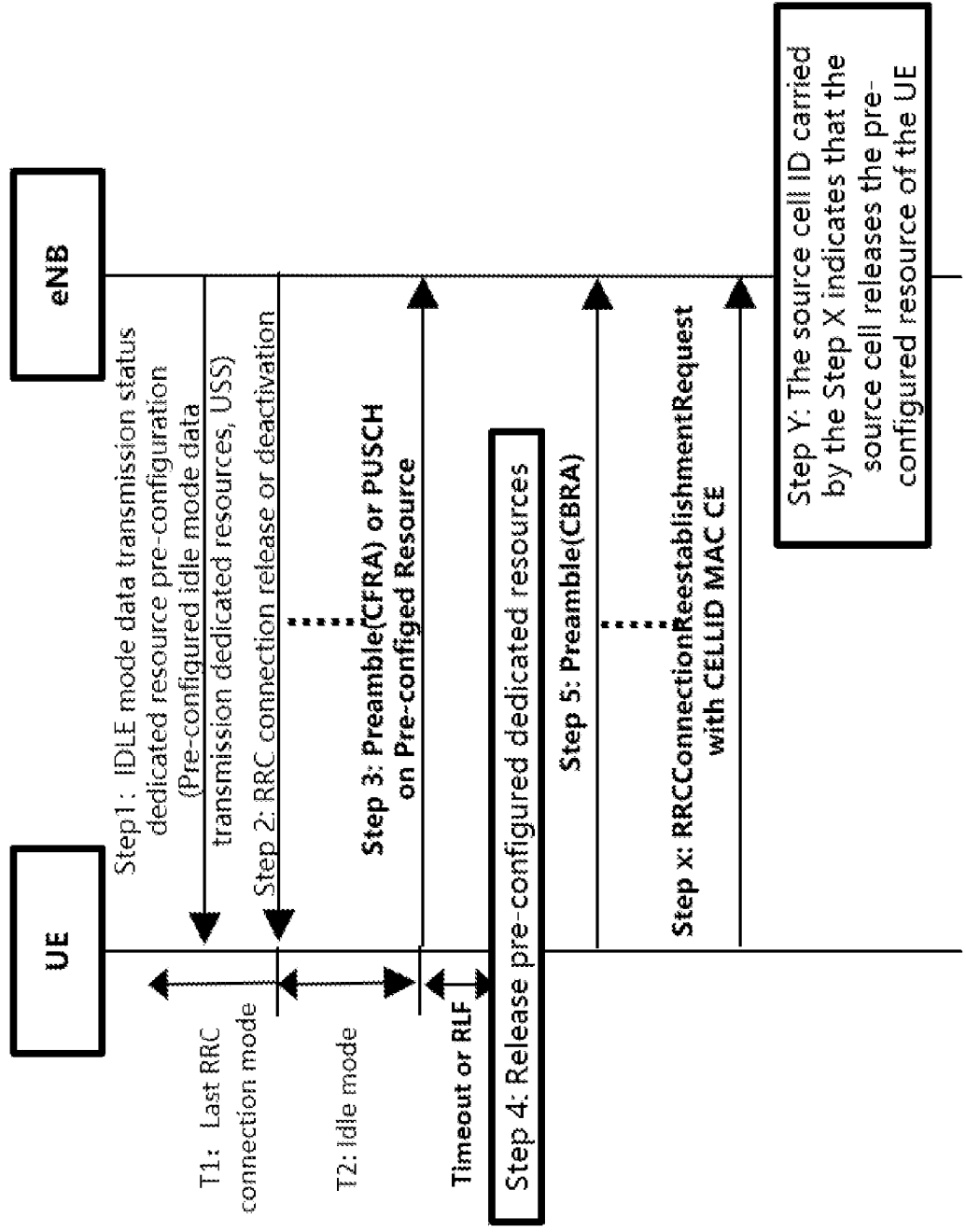
FIGS. 9A-9D show example message/timing diagrams of abnormal processes of idle mode data transmission status.

FIGS. 9A-9D show example message/timing diagrams of abnormal processes of idle mode data transmission status. As shown in FIG. 9A, which is an example of an exception procedure for resolving idle mode data transfer status through the RRCConnectionReestablishmentRequest procedure, the example message and timing diagram includes:

Step 3: The UE sends PUSCH or CFRA on the Step 3 resource and starts the timer.

Step 4: If the timer expires and the eNB does not receive a response or the UE detects a radio link failure (RLF), the idle mode pre-configured dedicated resource is released.

Step 5: A PRACH process is triggered based on Contention-Based Random Access (CBRA) resource, in which the RRCConnectionReestablishment process is used.

Step X: The source cell global identifier (CGI) from which the idle mode dedicated resource is configured is carried in the RRCConnectionReestablishmentRequest message. The source cell global identifier (CGI) may be carried by the MAC CE or the RRC message.

Step Y: Based on the source cell identity (e.g., CGI) received in Step X, the eNB indicates the source cell to release the preconfigured idle mode dedicated resource.

Figure 9B:
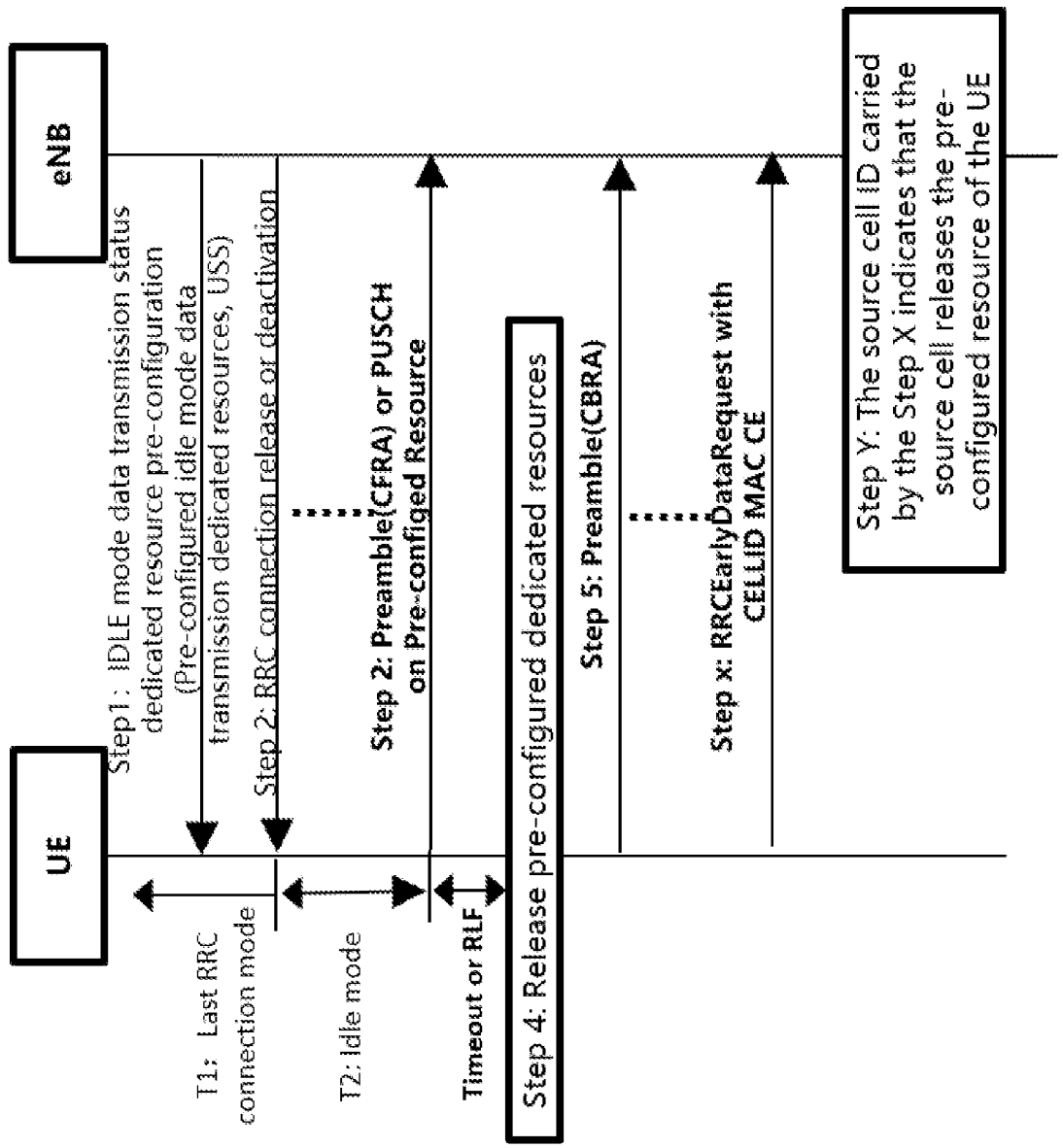

As shown in FIG. 9B, which is an example of an exception procedure for resolving idle mode data transfer status through the RRCEarlyDataRequest procedure, the example message and timing diagram includes:

Step 3: The UE sends PUSCH or CFRA on the Step 3 resource and starts the timer.

Step 4: If the timer runs out and the eNB does not receive the response or the UE detects a wireless link failure (RLF), the idle mode pre-configured dedicated resource is released.

Step 5: A PRACH process is triggered based on Contention-Based Random Access (CBRA), in which the RRCEarlyDataRequest process is used.

Step X: The source cell identifier from which the idle mode dedicated resource is configured is carried in the RRCEarlyDataRequest message. The source cell identifier may be carried by the MAC CE or the RRC message.

Step Y: Based on the source cell identity received in Step X, the eNB indicates the source cell to release the preconfigured idle mode dedicated resources.

Figure 9C:
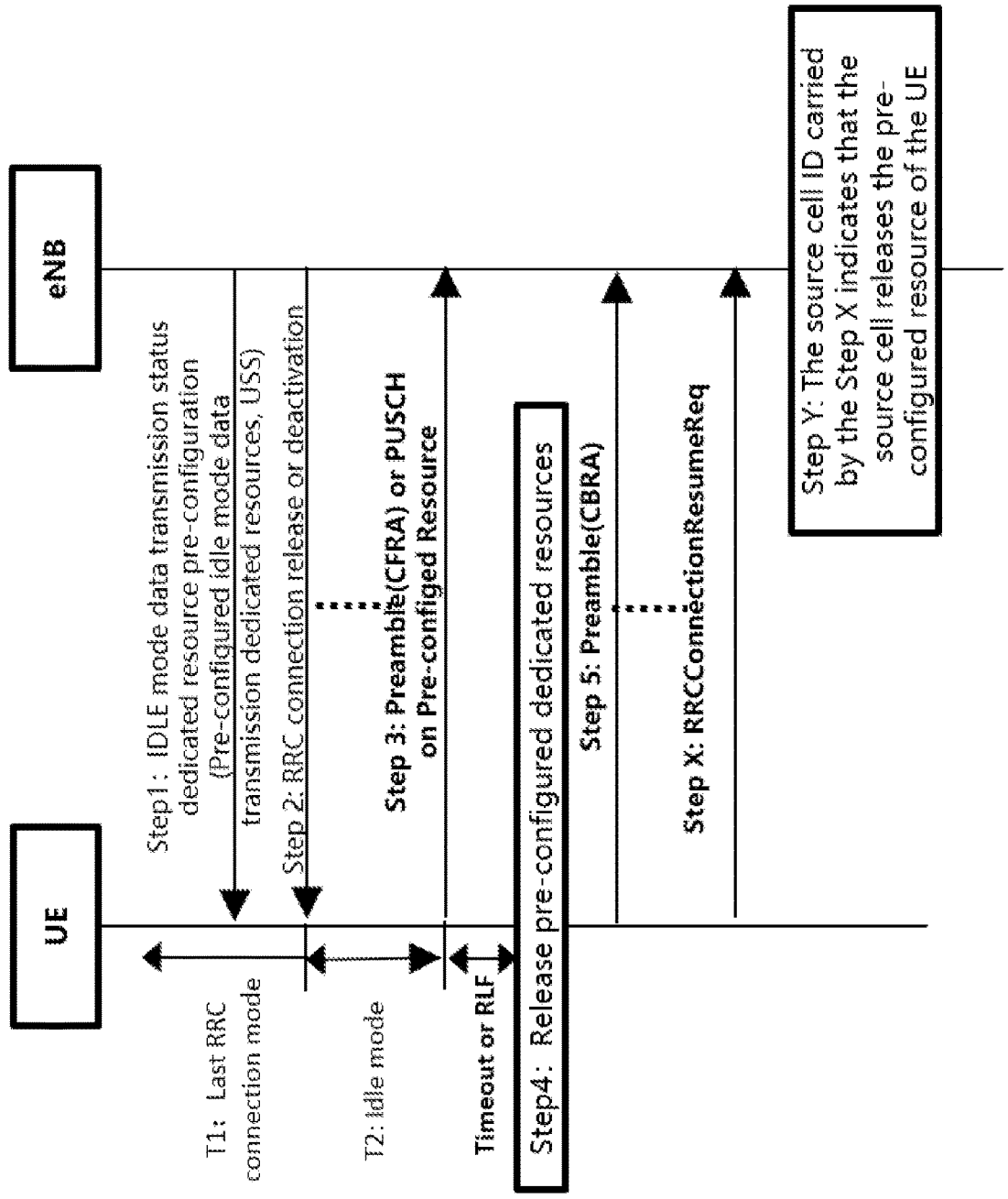

As shown in FIG. 9C, which is an example of an exception procedure for resolving idle mode data transfer status through the RRCConnectionResumeRequest procedure, the example message and timing diagram includes:

Step 3: The UE sends PUSCH or CFRA on the Step 3 resource and starts the timer.

Step 4: If the timer runs out and the eNB does not receive the response or the UE detects or wireless link failure (RLF), the idle mode pre-configured dedicated resource is released.

Step 5: A Contention-Based Random Access (CBRA) procedure is triggered, in which the RRCConnectionResumeRequest process or a resource release request message is used.

Step X: The source cell identity and terminal identity (e.g., ResumeId) are carried in the RRCConnectionResumeRequest or the resource release request message.

Step Y: Based on the source cell identity and terminal identity received in Step X, the eNB indicates the source cell to release the preconfigured dedicated resources of the idle mode.

Figure 9D:
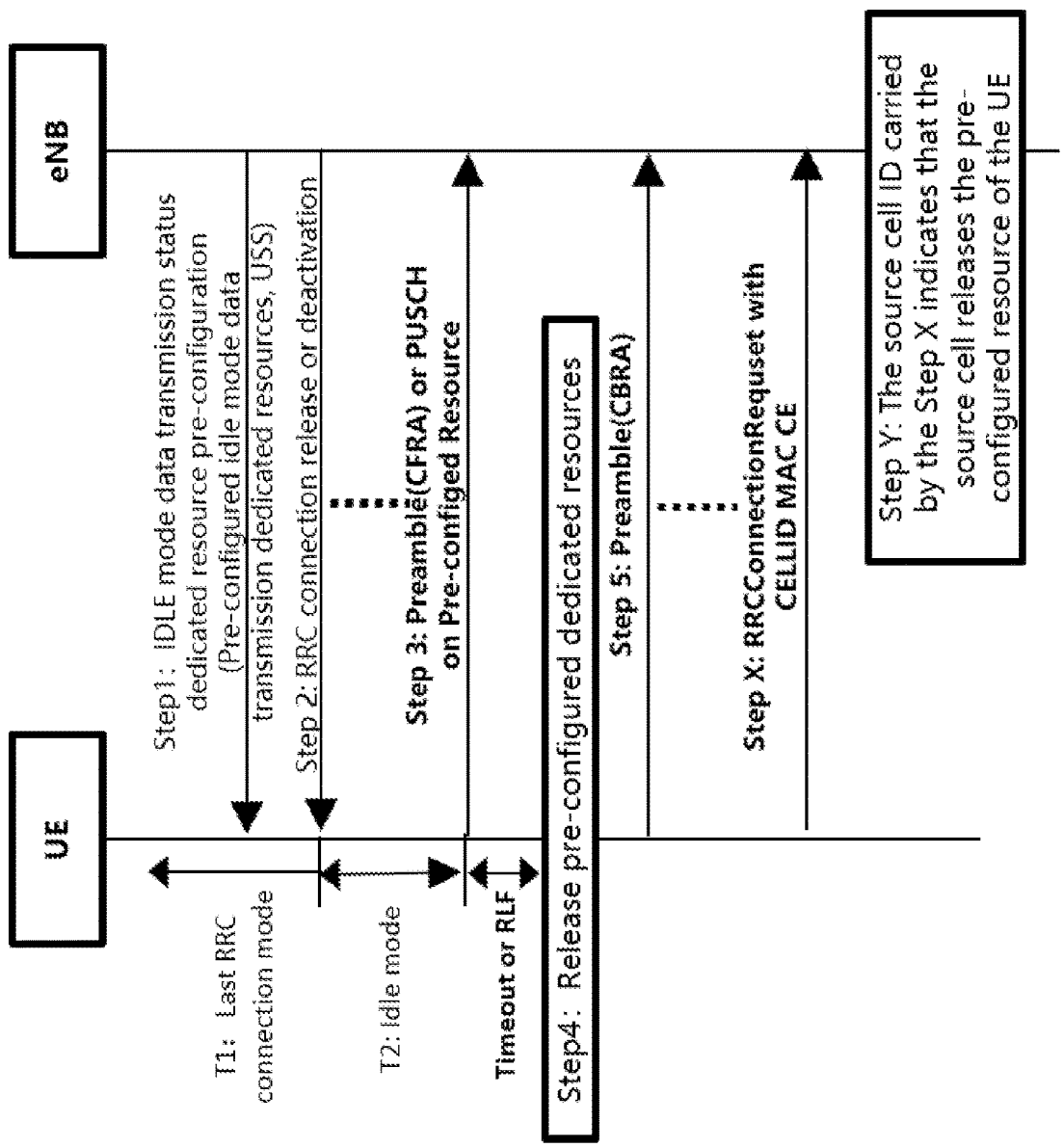

As shown in FIG. 9D, which is an example of an exception procedure for resolving idle mode data transfer status through the RRCConnectionRequest procedure, the example message and timing diagram includes:

Step 3: The UE sends PUSCH or CFRA on the Step 3 resource and starts the timer.

Step 4: Idle mode preconfigured dedicated resources are released if the timer runs out and no eNB response is received or the UE detects a wireless Link failure (RLF).

Step 5: A Contention-Based Random Access (CBRA) process is triggered, in which the RRCConnectionRequest process is used.

Step X: The source cell identifier from which the idle mode dedicated resource is preconfigured is carried in the RRCConnectionRequest message. The source cell identifier may be carried by the MAC CE or the RRC message.

Step Y: Based on the source cell identifier received in Step X, the eNB indicates the source cell to release the preconfigured idle mode dedicated resources.

FIGS. 10A and 10B show example message/timing diagrams of resource release when a UE in an idle mode pre-configured dedicated resource state experiences a cell reselection or an enhanced coverage level change. As shown in FIG. 10A, which is an example of resource release for UE in an idle mode pre-configured dedicated resource state after cell reselection, the example message and timing diagram includes:

Step 3: The UE in the idle mode pre-configured dedicated resource performs cell reselection.

Step 4: The UE releases the idle mode pre-configured dedicated resources.

Step 5: The UE triggers the Contention-Based Random Access (CBRA) process when data is transmitted and/or received.

Step X: The UE sends the source cell identity (e.g., CGI) from which the idle mode dedicated resource is pre-configured and UE ID to the eNB via RRC messages and/or MAC CE with RRC messages.

Step Y: The eNB indicates the source cell to release the idle mode pre-configured dedicated resource based on the source cell identifier (CGI) received in Step X.

As shown in FIG. 10B, which is an example of a resource release in which the UE in idle-mode preconfigured dedicated resource state has undergone an enhanced coverage-level change (i.e., the cell radio condition deteriorates), the example message and timing diagram includes:

Step 3: The UE in the idle mode pre-configured dedicated resource state has undergone an enhanced coverage level change (i.e., the cell radio condition deteriorates).

Step 4: The UE releases the idle mode pre-configured dedicated resources.

Step 5: The UE triggers the Contention-Based Random Access (CBRA) process when data is transmitted and/or received.

Step X: The UE sends the RRC message, which carries the UE identity.

Step Y: The eNB releases the idle mode pre-configured dedicated resource based on the UE identifier received in Step X.

As discussed in the context of FIGS. 2-10, embodiments of the disclosed technology provide numerous advantageous features that include, but are not limited to:

(1) The UE's behavior in data transmission state in an idle mode based on pre-configured dedicated resources;

(2) UE's transition strategy between the three states: [i] RRC idle state, [ii] a data transmission state in an idle mode based on pre-configured dedicated resources, and [iii] RRC connection state;

(3) Data transmission DRX (Discontinuous Reception) state in an idle mode based on pre-configured dedicated resources;

(4) The contention resolution strategy (UE identification) for UE in data transmission state in an idle mode based on pre-configured dedicated resources; and (5) The rollback policy when there is abnormality for UE in data transmission state in an idle mode based on pre-configured dedicated resources and a release process of pre-configured dedicated resources.

FIG. 11 shows an example of a wireless communication method 1100 for implementing state transitions for data communications over pre-configured dedicated resources during the RRC idle state, which may be implemented at a base station (or network node, network device, eNodeB, gNB, and so on). The method 1100 includes, at step 1110, transmitting a first message comprising an indication of pre-configured dedicated resources for a communication between the network device and a terminal.

The method 1100 includes, at step 1120, receiving a second message over the pre-configured dedicated resources, wherein a transmission of the second message by the terminal causes the terminal to switch from an idle state to a data transmission state in an idle mode. In some embodiments, the idle state is characterized by the terminal (or UE, wireless device, mobile device, and so on) without an established RRC connection, and the data transmission state in the idle mode is characterized by the terminal performing (i) perform the communication with the network device over the pre-configured dedicated resources, (ii) monitor a user-specific search space, and (iii) perform terminal identification using the pre-configured dedicated resources.

In some embodiments, the method 1100 further includes transmitting a third message comprising a trigger that causes the terminal to switch to the idle state, wherein the third message is transmitted before the second message.

In some embodiments, the pre-configured dedicated resources comprise a terminal-specific search space in the data transmission state in the idle mode (USS_IDLE), a physical uplink shared channel (PUSCH) resource, or a contention-free random access (CFRA) resource.

FIG. 12 shows another example of a wireless communication method 1200 for implementing state transitions for data communications over pre-configured dedicated resources during the RRC idle state, which may be implemented at a user equipment (or terminal, mobile device, and so on). The method 1200 includes, at step 1210, receiving a first message comprising an indication of pre-configured dedicated resources for a communication between a network device and the terminal.

The method 1200 includes, at step 1220, switching from an idle state to a data transmission state in an idle mode upon transmitting a second message over the pre-configured dedicated resources. In some embodiments, the idle state is characterized by the terminal (or UE, wireless device, mobile device, and so on) without an established RRC connection, and the data transmission state in the idle mode is characterized by the terminal performing (i) perform the communication with the network device over the pre-configured dedicated resources, and (ii) monitor a user-specific search space.

In some embodiments, the method 1200 further includes receiving a second message comprising a trigger, and entering the idle state based on the trigger.

In some embodiments, the pre-configured dedicated resources comprises the PUSCH resource, and the method 1200 further includes performing a PUSCH transmission on signaling radio bearers (SRBs) or data radio bearers (DRBs). In other embodiments, the method 1200 may further include monitoring, upon completion of the performing the PUSCH transmission, a physical downlink control channel (PDCCH) on the terminal-specific search space in the data transmission state in the idle mode (USS_IDLE). In an example, the monitoring the PDCCH includes monitoring the PDCCH DCI (downlink control information) via terminal-specific RNTI (radio network temporary identifier). In yet other embodiments, the method 1200 may further include successfully completing the terminal identification, and switching to an RRC connection state or a state specified by the network device.

In some embodiments, the pre-configured dedicated resources comprise the CFRA resource, and the method 1200 further includes transmitting a preamble in a pre-configured CFRA resource location, and monitoring a PDCCH (physical downlink control channel) scrambled with the (random access) RA-RNTI (radio network temporary identifier) corresponding to the CFRA resource or scrambled with a terminal-specific RNTI. In other embodiments, the method 1200 further includes receiving a Random Access Response (RAR) message in a PDSCH (physical downlink shared channel) resource granted by the PDCCH, wherein the RAR message comprises an uplink (UL) Grant, and transmitting, in response to receiving the UL Grant, a C-RNTI (cell-RNTI) MAC (medium access control) CE (control element).

In some embodiments, the terminal is configured to perform discontinuous reception (DRX) while in the data transmission state in the idle mode (USS_IDLE).

In some embodiments, wherein the pre-configured dedicated resources comprise a terminal-specific search space in the data transmission state in the idle mode (USS_IDLE), and wherein the terminal monitors a (physical downlink control channel) PDCCH for a PDCCH DCI (downlink control information) message in a dedicated search space.

In some embodiments, the PDCCH DCI message comprises at least one of the following information: confirmation of uplink information sent by the terminal during the idle mode over the pre-configured dedicated resources, an instruction that instructs the terminal to switch to the idle state, an instruction that instructs the terminal to switch to a state comprising the RRC connection, PUSCH resource scheduling (UL Grant) for the terminal, PDSCH resource scheduling (DL Grant) for the terminal, or an indication for the terminal to initiate a physical random access channel (PRACH) procedure.

Example Implementations of the Disclosed Technology

Figure 13:
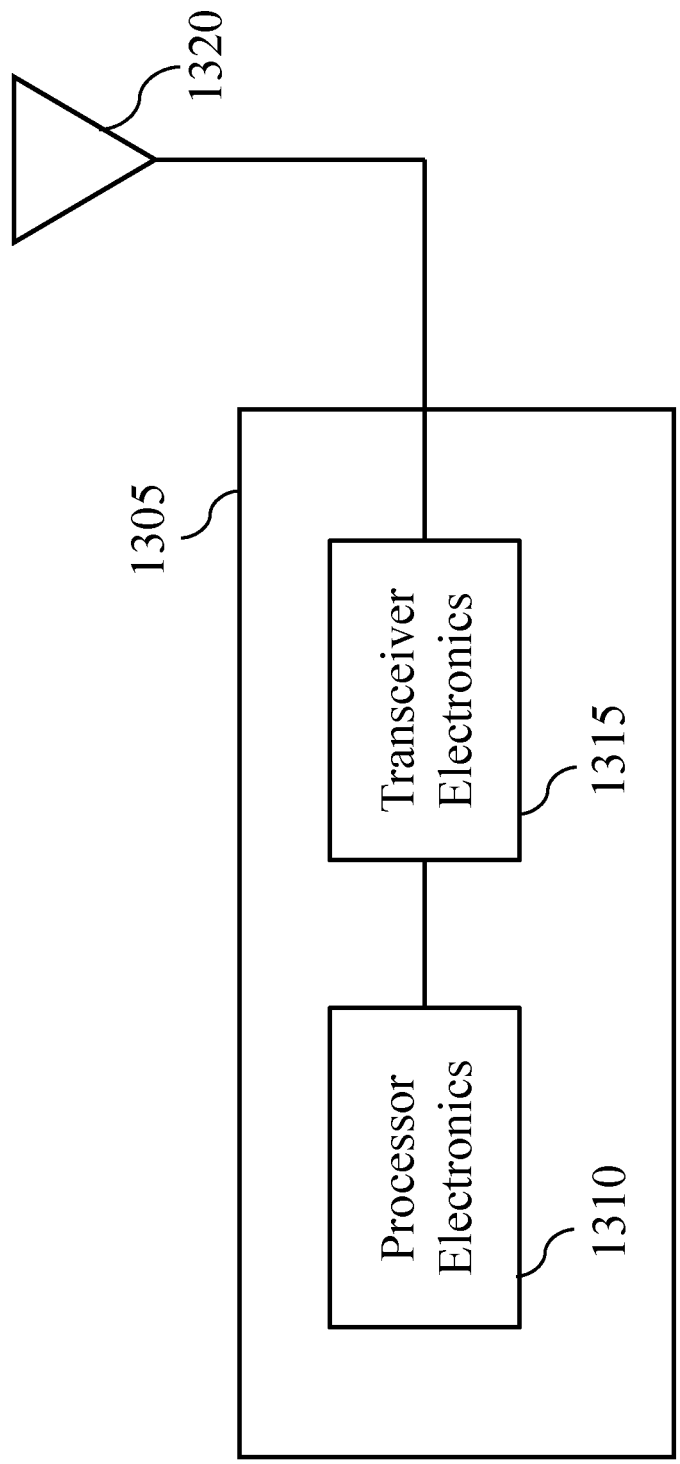
FIG. 13 is a block diagram representation of a portion of an apparatus, in accordance with some embodiments of the presently disclosed technology.

FIG. 13 is a block diagram representation of a portion of an apparatus, in accordance with some embodiments of the presently disclosed technology. An apparatus 1305, such as a base station or a wireless device (or UE), can include processor electronics 1310 such as a microprocessor that implements one or more of the techniques presented in this document. The apparatus 1305 can include transceiver electronics 1315 to send and/or receive wireless signals over one or more communication interfaces such as antenna(s) 1320. The apparatus 1305 can include other communication interfaces for transmitting and receiving data. Apparatus 1305 can include one or more memories (not explicitly shown) configured to store information such as data and/or instructions. In some implementations, the processor electronics 1310 can include at least a portion of the transceiver electronics 1315. In some embodiments, at least some of the disclosed techniques, modules or functions are implemented using the apparatus 1305.

It is intended that the specification, together with the drawings, be considered exemplary only, where exemplary means an example and, unless otherwise stated, does not imply an ideal or a preferred embodiment. As used herein, the singular forms "a", "an" and "the" are intended to include the plural forms as well, unless the context clearly indicates otherwise. Additionally, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, implemented at a terminal, comprising:
    receiving a first message comprising an indication of pre-configured dedicated resources for a communication between a network device and the terminal, wherein the first message is received by the terminal in an established radio resource control (RRC) connection, and wherein the pre-configured dedicated resources comprise a pre-configured physical uplink shared channel (PUSCH) resource;
    performing, in an idle mode and on the pre-configured PUSCH resource, a PUSCH transmission carrying signaling radio bearers (SRBs) or data radio bearers (DRBs); and
    monitoring, subsequent to the performing the PUSCH transmission, a downlink control information (DCI) scrambled with a terminal-specific radio network temporary identifier (RNTI).

2. The method of claim 1, further comprising:
    monitoring, upon completion of the performing the PUSCH transmission, a physical downlink control channel (PDCCH) on a terminal-specific search space in the idle mode (USS_IDLE).

3. The method of claim 2, wherein the method further comprises:
    successfully completing a terminal identification; and
    switching to a state specified by the network device.

4. The method of claim 1, wherein the PUSCH transmission comprises at least one of following: a dedicated non-access stratum (NAS) protocol data unit (PDU) information, a user-level data PDU, an RRC message, or a MAC CE.

5. An apparatus for wireless communication, implemented at a terminal, comprising:
    a processor configured to:
        receive a first message comprising an indication of pre-configured dedicated resources for a communication between a network device and the terminal, wherein the first message is received by the terminal in an established radio resource control (RRC) connection, and wherein the pre-configured dedicated resources comprise a pre-configured physical uplink shared channel (PUSCH) resource;
        perform, in an idle mode and on the pre-configured PUSCH resource, a PUSCH transmission carrying signaling radio bearers (SRBs) or data radio bearers (DRBs); and
        monitor, subsequent to the performing the PUSCH transmission, a downlink control information (DCI) scrambled with a terminal-specific radio network temporary identifier (RNTI).

6. The apparatus of claim 5, wherein the processor is further configured to:
    monitoring, upon completion of the performing the PUSCH transmission, a physical downlink control channel (PDCCH) on a terminal-specific search space in the idle mode (USS_IDLE).

7. The apparatus of claim 6, wherein the processor is further configured to:
    successfully complete a terminal identification; and
    switch to a state specified by the network device.

8. The apparatus of claim 5, wherein the PUSCH transmission comprises at least one of following: a dedicated non-access stratum (NAS) protocol data unit (PDU) information, a user-level data PDU, an RRC message, or a MAC CE.

9. A non-transitory computer-readable storage medium having instructions stored thereupon for wireless communication, implemented at a terminal, the non-transitory computer-readable storage medium comprising:
    instructions for receiving a first message comprising an indication of pre-configured dedicated resources for a communication between a network device and the terminal, wherein the first message is received by the terminal in an established radio resource control (RRC) connection, and wherein the pre-configured dedicated resources comprise a pre-configured physical uplink shared channel (PUSCH) resource;
    instructions for performing, in an idle mode and on the pre-configured PUSCH resource, a PUSCH transmission carrying signaling radio bearers (SRBs) or data radio bearers (DRBs); and
    instructions for monitoring, subsequent to the performing the PUSCH transmission, a downlink control information (DCI) scrambled with a terminal-specific radio network temporary identifier (RNTI).

10. The non-transitory computer-readable storage medium of claim 9, wherein the non-transitory computer-readable storage medium further comprises:
    instructions for monitoring, upon completion of the performing the PUSCH transmission, a physical downlink control channel (PDCCH) on a terminal-specific search space in the idle mode (USS_IDLE).

11. The non-transitory computer-readable storage medium of claim 10, wherein the non-transitory computer-readable storage medium further comprises:
    instructions for successfully completing a terminal identification; and
    instructions for switching to a state specified by the network device.

12. The non-transitory computer-readable storage medium of claim 9, wherein the PUSCH transmission comprises at least one of following: a dedicated non-access stratum (NAS) protocol data unit (PDU) information, a user-level data PDU, an RRC message, or a MAC CE.

13. A method for wireless communication, implemented at a network device, comprising:
    transmitting a first message comprising an indication of pre-configured dedicated resources for a communication between the network device and a terminal, wherein the first message is transmitted to the terminal in an established radio resource control (RRC) connection, and wherein the pre-configured dedicated resources comprise a pre-configured physical uplink shared channel (PUSCH) resource;
    receiving, from the terminal in an idle mode and on the pre-configured PUSCH resource, a PUSCH transmission carrying signaling radio bearers (SRBs) or data radio bearers (DRBs); and
    transmitting, subsequent to the receiving the PUSCH transmission, a downlink control information (DCI) scrambled with a terminal-specific radio network temporary identifier (RNTI).

14. The method of claim 13, wherein the pre-configured dedicated resources comprise a terminal-specific search space in the idle mode (USS_IDLE) or a physical uplink shared channel (PUSCH) resource.

15. The method of claim 13, wherein the pre-configured dedicated resources comprise a terminal-specific search space in the idle mode (USS_IDLE).

16. An apparatus for wireless communication, implemented at a network device, comprising:
    a processor configured to:
    transmit a first message comprising an indication of pre-configured dedicated resources for a communication between the network device and a terminal, wherein the first message is transmitted to the terminal in an established radio resource control (RRC) connection, and wherein the pre-configured dedicated resources comprise a pre-configured physical uplink shared channel (PUSCH) resource;
        receive, from the terminal in an idle mode and on the pre-configured PUSCH resource, a PUSCH transmission carrying signaling radio bearers (SRBs) or data radio bearers (DRBs); and
    transmit, subsequent to the receiving the PUSCH transmission, a downlink control information (DCI) scrambled with a terminal-specific radio network temporary identifier (RNTI).

17. The apparatus of claim 16, wherein the pre-configured dedicated resources comprise a terminal-specific search space in the idle mode (USS_IDLE) or a physical uplink shared channel (PUSCH) resource.

18. The apparatus of claim 16, wherein the pre-configured dedicated resources comprise a terminal-specific search space in the idle mode (USS_IDLE).

\* \* \* \* \*